United States Patent
Peters

(10) Patent No.: US 11,836,655 B2
(45) Date of Patent: Dec. 5, 2023

(54) PROJECT MANAGEMENT DEVICES, SYSTEMS AND METHODS

(71) Applicant: Christman Constructors, Inc., Lansing, MI (US)

(72) Inventor: Douglas J Peters, Lansing, MI (US)

(73) Assignee: CHRISTMAN CONSTRUCTORS, INC., Lansing, MI (US)

( * ) Notice: Subject to any disclaimer, the term of this patent is extended or adjusted under 35 U.S.C. 154(b) by 344 days.

(21) Appl. No.: 16/493,653

(22) PCT Filed: May 22, 2019

(86) PCT No.: PCT/US2019/033449
§ 371 (c)(1),
(2) Date: Sep. 12, 2019

(87) PCT Pub. No.: WO2019/226730
PCT Pub. Date: Nov. 28, 2019

(65) Prior Publication Data
US 2021/0334733 A1   Oct. 28, 2021

Related U.S. Application Data

(60) Provisional application No. 62/785,835, filed on Dec. 28, 2018, provisional application No. 62/674,912, filed on May 22, 2018.

(51) Int. Cl.
*G06Q 30/00* (2023.01)
*G06Q 10/0631* (2023.01)
(Continued)

(52) U.S. Cl.
CPC ... *G06Q 10/063112* (2013.01); *G06F 3/0482* (2013.01); *G06F 16/2445* (2019.01);
(Continued)

(58) Field of Classification Search
CPC ... G06Q 10/063112; G06Q 10/063114; G06Q 10/06312; G06Q 10/06395; G06Q 10/00;
(Continued)

(56) References Cited

U.S. PATENT DOCUMENTS 7,031,930 B2   4/2006   Freeman
2005/0125273 A1   6/2005   Simons et al.
(Continued)

OTHER PUBLICATIONS

Zhen-Yu Zhao and Lin-Ling Duan, "An integrated risk management model for construction projects," PICMET '08—2008 Portland International Conference on Management of Engineering & Technology, 2008, pp. 1389-1394, doi: 10.1109/PICMET.2008.4599751. (Year: 2008).*

(Continued)

*Primary Examiner* — Joseph M Waesco
*Assistant Examiner* — Jay-Ming Wang
(74) *Attorney, Agent, or Firm* — Fitch, Even, Tabin & Flannery, LLP

(57) ABSTRACT

A device, system and method for mapping and filtering project data, such as construction project criteria, which may have the steps of selecting a map view option from of list of application features; launching a map view in response to selecting the map view; selecting at least one database filter; applying the at least one selected database filter to a system database to generate a list of selected filtered records; and generating a map showing the geographic locations of the selected filtered records. The at least one filter may be selected from at least one of the group of personnel, equipment, project sites and/or offices. The at least one filter can be a personnel filter, filtered by at least one of trade, skill level and/or active status.

6 Claims, 35 Drawing Sheets

(51) Int. Cl.
  *G06F 16/28* (2019.01)
  *G06F 16/242* (2019.01)
  *G06F 16/29* (2019.01)
  *G06F 3/0482* (2013.01)
(52) U.S. Cl.
  CPC ............ *G06F 16/287* (2019.01); *G06F 16/29* (2019.01); *G06Q 10/06312* (2013.01); *G06Q 10/063114* (2013.01)
(58) Field of Classification Search
  CPC ........ G06Q 10/02; G06Q 10/06; G06Q 10/10; G06Q 30/02; G06F 16/287; G06F 16/2445; G06F 16/29; G06F 3/0482; G05B 2219/31357
  See application file for complete search history.

(56) References Cited

U.S. PATENT DOCUMENTS

| | | | |
|---|---|---|---|
| 2006/0047630 A1 | 3/2006 | Furuno et al. | |
| 2007/0027732 A1* | 2/2007 | Hudgens | G06Q 10/0631 705/7.17 |
| 2008/0084333 A1 | 4/2008 | Forrest et al. | |
| 2014/0096019 A1* | 4/2014 | Gowen | G06F 3/1204 715/738 |
| 2014/0096022 A1* | 4/2014 | Shlimovich | G06F 3/0484 715/738 |
| 2014/0096029 A1* | 4/2014 | Schultz | G06F 3/1242 715/747 |
| 2014/0096037 A1* | 4/2014 | Grosz | G06F 3/1242 715/753 |
| 2014/0096038 A1* | 4/2014 | Schultz | H04L 67/51 715/753 |
| 2014/0096039 A1* | 4/2014 | Schultz | G06Q 30/0621 715/753 |
| 2014/0096040 A1* | 4/2014 | Grosz | G06F 40/186 715/753 |
| 2014/0096041 A1* | 4/2014 | Gowen | G06Q 30/0621 715/753 |
| 2014/0244329 A1* | 8/2014 | Urban | G06Q 10/063114 705/7.15 |
| 2015/0156075 A1* | 6/2015 | Gist | H04L 41/22 709/201 |
| 2016/0275453 A1* | 9/2016 | Powers | G06F 3/0483 |
| 2016/0328789 A1* | 11/2016 | Grosz | G06F 3/1287 |

OTHER PUBLICATIONS

International Search Report and Written Opinion for PCT/US2019/033449 dated Jul. 24, 2019 (13 Pages).

* cited by examiner

Start typing....
▽ Projects [SELECT]

ABC Co
Scottsville KY 42164 USA
Start Date: June 16th 2017
End Date: Febuary 10th 2018

Acme Corp
223 More Hwy Glasgow KY 42421
Start Date: June 16th 2017
End Date: Febuary 10th 2018

Alberici Forest Park Golf Course
6141 Lagoon dr St. Louis MO 63112
Start Date: June 16th 2017
End Date: Febuary 10th 2018

Alerici Group
8800 Page Avenue Overland MO
Start Date: June 16th 2017
End Date: Febuary 10th 2018

Details        Notes
[EDIT]         Edit Project Record
[DELETE]       Is Active: ◯
               Status:    Not Started
               Name:      ABC Co
               Address:   Scottsville KY 42164 USA
               Manager:
               Number:    171082
               Type:      Masonary

Equipment  SELECT

Boom lift
Kentucky, USA
Start Date: June 16th 2017
End Date: Febuary 10th 2018

Bulldozer
Butler County KY USA
Start Date: June 16th 2017
End Date: Febuary 10th 2018

Compactor
Butler County KY USA
Start Date: June 16 2017
End Date: Febuary 10th 2018

Grader
Leroy Taylor Rd Kentucky 42164 USA
Start Date: June 16th 2017
End Date: Febuary 10th 2018

Scraper
223 More Hwy Glasgow KY 42141
Start date: June 16th 2017

Edwards Jones
Classic Cleaners
Enchanted Celebrations
Scottsville Urgent Clinic
Curl Up & Dye Beauty Salon ▽ Equipment [SELECT]

Generator
502 Mammoth Cave St.
Cave City KY 42127 USA
Start Date: June 16th 2017
End Date: Febuary 10th 2018

Generator
Butler County KY USA
Start Date: June 16th 2017
End Date: Febuary 10th 2018

Track Hoe
Butler County KY USA
Start Date: June 16th 2017
End date: Febuary 10th 2018

Compactor
Kentucky USA
Start Date: June 16th 2017
End Date: Febuary 10th 2018

Details    Notes

[EDIT]
[DELETE]

Edit Equipment Record

Is Active: ◯

Name:    Track Hoe

Address:  Butler County KY 42164 USA

Project:

FIG. 24

Start typing...

▷ Projects    [SELECT]

▷ Personnel   [SELECT]

▽ Office      [SELECT]

testMapOne
India.Ahmedabad
Start Date: June 16th 2017
End Date: Febuary 10th 2018 test2
UK, London
Start Date: June 16th 2017
End Date: Febuary 10th 2018

FIG. 25

▽ Personnel   [SELECT]

post personnel new
Mobile: 1234567890
Trade: operator
Level: foreman

▽ Office testMapOne
India, Ahmedabad
Start Date: June 16th 2017
End Date: Febuary 10th 2018 test2
uk, London
Start Date: June 16th 2017
End Date: Febuary 10th 2018

Details       Notes

[EDIT]        Edit Equipment Record

[DELETE]      Is Active: ⬭

Name: testMapOne

Address: India, Ahmendabad

FIG. 26

| Activities | Map  Activity  Create  PM  X |
|---|---|

○ Grib John          edited Monday, December 3, 2018 at 9:45 AM EST
jgrib@alberici.com edited this personnel with the following attributes:
first_name   John
phone        314568483
prco         none
jobName      Alberici Group
address      1118 Highland Farms Dr, Wentzville, MO 63385
expertise    Carpentry
trade        concrete
company      TCC
last_name    Grib
level        journeyman ○ Grib John          edited Monday, December 3, 2018 at 9:42 AM EST
jgrib@alberici.com edited this personnel with the following attributes:
first_name   John
phone        314568483
prco         none
jobName      Alberici Group
address      1118 Highland Farms Dr, Wentzville, MO 63385
expertise    Carpentry
trade        concrete
company      TCC
last_name    Grib
level        journeyman

FIG. 32

You are receiving this CopperWorks message because you are a current or former employee of Christman Constructors. CopperWorks is an IOS tool that allows CCI to communicate with you using SMS texting. Communications include employment opportunities, work assignments, safety messages, and any other communication. First, CW needs your consent to communicate with you using this tool. If you wish to be a part of this service, please provide your updated name and address. This provides your consent to be a part of CopperWorks. Reply STOP to unsubscribe. If you would like to view the Terms of Service for this product reply TOS. Reply PP to view the Privacy Policy.

FIG. 34

Layoff message/job completion

Thank you for your service with [CCI] There is currently a lack of available work, as a result, today is your last day of employment with CCI, until more work is available.
Please contact [name (nick or fletcher)] [telephone] with any questions.

FIG. 35

Weather warning (tornado)

Hi this is CopperWorks. Please be advised of a significant [weather event] The following [project] will be closed [tomorrow]. If you have questions contact [name/number]

FIG. 36

Schedule change (pour rescheduled)

The concrete placement scheduled for [date/time] at [project] is delayed. The new date and time is _____.

FIG. 37

Reminders/ General notifications (training)

Hi this is CopperWorks. This is a reminder of the [safety orientation with lunch provided tomorrow 8/16] at [location]

FIG. 38

Initial Assign

Welcome to Christman Constructors. You [name] have been assigned to [project location] starting on [date] at [time] call at 555-555-5555 with any questions Reply Y to indicate you accept this assignment. Reply N to indicate you do not with to accept. Reply Q to indicate you want to discuss.

[Name] please report to [project location] on [this date] at [this time]. Parking information Questions contact [SI] at [999-999-9999]

FIG. 39

| DATE? | SERVICE | DIRECTION | FROM | TO | #SEGMENTS | STATUS | MEDIA |
|---|---|---|---|---|---|---|---|
| 20:22:06 UTC 2018-11-27 | — | Outgoing API | (231) 468 6115 | (317) 713 1075 | 2 | Delivered | — |
| 20:03:24 UTC 2018-11-26 | — | Outgoing API | (231) 468 6115 | (517) 802 1075 | 1 | Undelivered | — |
| 11:14:48 UTC 2018-11-26 | — | Outgoing API | (231) 468 6115 | (269) 983 6328 | 2 | Undelivered | — |
| 07:37:31 UTC 2018-11-26 | — | Outgoing API | (231) 468 6115 | (248) 238 7001 | 1 | Delivered | — |
| 07:34:36 UTC 2018-11-26 | — | Outgoing API | (231) 468 6115 | (248) 238 7001 | 1 | Delivered | — |
| 07:34:08 UTC 2018-11-26 | — | Outgoing API | (231) 468 6115 | (248) 238 7001 | 1 | Delivered | — |
| 07:33:50 UTC 2018-11-26 | — | Outgoing API | (231) 468 6115 | (248) 238 7001 | 1 | Delivered | — |
| 07:33:37 UTC 2018-11-26 | — | Outgoing API | (231) 468 6115 | (248) 238 7001 | 1 | Delivered | — |
| 20:37:08 UTC 2018-11-20 | — | Outgoing API | (231) 468 6115 | (989) 501 1460 | 1 | Delivered | — |
| 20:37:07 UTC 2018-11-20 | — | Outgoing API | (231) 468 6115 | (314) 568 4803 | 1 | Delivered | — |
| 20:36:13 UTC 2018-11-20 | — | Outgoing API | (231) 468 6115 | (314) 568 4803 | 2 | Delivered | — |
| 19:06:13 UTC 2018-11-20 | — | Outgoing API | (231) 468 6115 | (989) 501 1460 | 2 | Delivered | — |

FIG. 42

Reply STOP to Unsubscribe. If you would like to view the Terms of Service for this product reply TOS. Reply PP to view the Privacy Policy.

FIG. 43

PROJECT MANAGEMENT DEVICES, SYSTEMS AND METHODS

CROSS-REFERENCE TO RELATED APPLICATIONS

This application is a U.S. national phase application filed under 35 U.S.C. § 371 of International Application No. PCT/US2019/033449, filed May 22, 2019, designating all member states, which claims priority from U.S. Provisional Patent Application Ser. No. 62/674,912, filed May 22, 2018, and from U.S. Provisional Patent Application Ser. No. 62/785,835, filed Dec. 28, 2018, which are hereby incorporated herein by reference in their entirety for all purposes.

FIELD

Disclosed herein are embodiments to manage projects, such as construction projects, and the like, and in particular, devices, systems and methods to manage projects and the like with interactive mapping, filtering, and optionally with SMS and use of third-party databases and applications.

BACKGROUND

Management of projects, such as construction projects is often a time consuming, labor intensive and inefficient process, especially for complex and large scale commercial construction projects involving multiple contractors, sub-contractors, large equipment, tight and overlapping timelines, labor force availability during construction, and the like. This time-consuming process often precludes close monitoring of all subcontractors, especially major subcontractors, personnel and equipment. In addition, current known processes, often performed manually in notebooks, do not have an efficient means for identifying potential problematic issues that may span multiple construction projects in multiple locations. (See generally, U.S. Pat. No. 7,031,930 to Freeman) Having a breakdown in or inefficient use of available and needed resources can vastly and negatively affect cost efficiencies and duration to completion of any construction project.

Similarly, when bidding on a construction project, contractors may need to take into account availability of not only equipment, but also the availability of skilled tradesmen, their experience, certifications, licensure and qualifications. Large construction companies can have permanent employees. However, for some companies, preparation of a cost and timeline estimates becomes complicated as the company may not have sufficient information of available contract personnel and/or equipment within a given geographic area.

Despite advances in the art of project management in the construction industry, there are no known dedicated and automated devices, methods or systems that can efficiently and cost effectively match available personnel and/or equipment to select project sites. Such devices, methods or systems are not only desired, but needed by project managers in the increasingly competitive construction industry.

SUMMARY

Accordingly, to advance at least the aforementioned deficiencies in the art, described herein are devices, systems and methods to manage projects, such as construction projects, utility company projects, Information Technology projects, delivery projects, and the like with interactive mapping and filtering and optionally with SMS and use of third party databases and applications. Throughout this disclosure, emphasis is made to construction projects, but it is noted that all types of projects that involve efficient management of people and/or equipment within a predetermined geographic area would benefit from these systems, methods and devices and are accordingly within the scope of this disclosure.

The present embodiments can be used to efficiently use multiple or minimal SMS text messages to people and other resources within, e.g., the closest proximity to a project or work site. The present embodiments can also use touch commands, SMS text, and mapping to direct/move humans and other resources from project point to project point on a User map, thus using minimal, if any, typed commands.

The present embodiments may have at least two primary functions including that SMS text blasts may be selected and multiple resources within a User defined radius distance of a project. The present embodiments provide user the ability to efficiently (with minimal or no typing commands and just by touching the screen) reassign or assign resources to and from predetermined project locations on a map. An SMS text blast feature identifies resources located with a certain range of a project, enables a user to quickly and efficiently visualize, filter, and select all available resources (people, people with desired skills such as carpenter, electrician, trucks, equipment, and the like) within a predetermined range of a project or work site, and then "SMS text blast" multiple resources within that predetermined range, with one preselected/predetermined SMS text blast, without typing and by just touching the screen. The User can send an unlimited number of SMS text messages to all resources within a User defined radius very efficiently with one message.

In another approach the present embodiments allow the ability of a User to move, assign, reassign resources by touching and then dragging a resource from one point (project) on the map to another point (project) on the map by only touching the screen. When movement is complete, a predetermined SMS message can be sent to the resource. In many cases the user does not have to type commands as predetermined commands can be selected and executed at the time the touch and drag resource movement option is complete.

In another approach, the present embodiments can provide resource movement command option. This can be an alternative method of reassigning resources. According to one approach, a method for resource movement command can include, for example, the steps of:

Viewing Resource Movement Screen Within Map;
The user touching/selecting an active project on map view with desired resources;
Showing the user All resources on that project;
User selecting resources to be moved to a new location on the map;
System responding to User touching "ok";
Moving the Screen back to map view;
System responding to user touching project location on map that resources shall be reassigned;
System responding to User touching drop down menu on map view by selecting and then displaying a predetermined message such as, for example, "tomorrow at 7:00 AM please report to Project ABC, located at 123 Acme Road, Kalamazoo Mich., park in lot next to building, your new superintendent is John Smith, call 517-232-7777 if you have questions. Thank you.";
System responding to User touching "ok" by generating an SMS text to all resources moved; and System allowing repeating the process until all resources are moved.

In use in a construction application, such systems and methods can effectively, efficiently and even automatically pair personnel and equipment to specific job sites within pre-selected geographic areas. Use of mapping and filtering of available personnel and equipment allows a more efficient and timely construction project to completion. Further, the present systems and methods can also provide a significant reduction of miles driven per project as the mapping feature automatically provides a filtering of available qualified resources of equipment and personnel relative to a job site location. In short, the present methods and systems can not only provide a construction manager with a faster and more efficient project completion, but also reduce traffic congestion and carbon emissions since emphasis can be given to utilization of assets closest to the work site.

According to one approach, an application for managing projects and people is provided and configured for a 'smart' device such as a smartphone, computer tablet (such as one sold under the tradename IPAD by APPLE INC. of Cupertino, CA), and the like. In one approach using mobile devices manufactured by Apple Inc an iOS operating system can be used.

It is another object of the invention to provide computer-executable system and method of providing interactive mapping and filtering. The filter function allows users the ability to apply filters that show Equipment, Personnel, Offices, physical office, project manager office, and the like, and Project based on predefined set of filters. The filter options have custom filters based on the categories, that allow the user to obtain the best end results.

It is another object of the invention to provide a method and system for maintaining a database of personnel, offices, projects and equipment. This is implemented by the use of a scrubbed datasheet, which provides information on Personnel (Active, Inactive, and Applicant), Equipment, Offices, and Projects. This allows the ability to update information in real time, both within the application and the datasheet. The scrubbed data sheet is a shared internal document that includes personnel (active and inactive), offices, applicants, and job assignments. The data sheet serves as the document for data integration into the application. The information within the scrubbed data sheet is imported into the application to provide the data.

It is another object of the invention to provide a method and system to provide SMS texting based on filtered criteria. SMS filtering allows users to view all messages that are being sent/received through the application, as well as isolate the ones that pertain to a specific application user, project, office, equipment and the like. The SMS filter allows users to filter through SMS that are specific to them, as well as all the SMS that are available. See FIG. 17 for an exemplary screenshot of an SMS Filter View.

These and other objects of the invention are achieved through a provision of a system and method, which manages personnel and equipment. The system can operate through a network and a server, while communicating with a user's electronic device such as a cell phone, a smart phone, a tablet, a laptop and the like. The server also communicates with one or more computers of offices and administrators. Employer, managers, administrators and contractor personnel can access the network using their respective electronic devices. Cloud communication platforms for building SMS (short message service), voice and messaging applications on an API (Application Programming Interface) (such as one sold under the tradename Twilio integration creates with the communication from the application to a user's electronic device. This allows for two-way communication from an end user's cell phone, to the application user's electronic device. Twilio provides the communication through the use of Programmable SMS Messaging.

Other features will become more apparent to persons having ordinary skill in the art to which the systems, devices and methods pertain and from the following description and claims.

BRIEF DESCRIPTION OF THE DRAWINGS

Reference will now be made to the drawings, wherein like parts are designated by like numerals.

FIG. 22 presents a screenshot of an Edit Project view in accordance with some of the present embodiments.

FIG. 23 presents a screenshot of an Equipment View in accordance with some of the present embodiments.

FIG. 24 presents a screenshot of an Edit Equipment View in accordance with some of the present embodiments.

FIG. 25 presents a screenshot of an Office View in accordance with some of the present embodiments.

FIG. 26 presents a screenshot of an Edit Office View in accordance with some of the present embodiments.

FIG. 32 presents a screenshot of an Activity View in accordance with some of the present embodiments.

FIG. 34 presents a screenshot of a Pre-populated message in accordance with some of the present embodiments.

FIG. 35 presents a screenshot of a Pre-populated message in accordance with some of the present embodiments.

FIG. 36 presents a screenshot of a Pre-populated message in accordance with some of the present embodiments.

FIG. 37 presents a screenshot of a Pre-populated message in accordance with some of the present embodiments.

FIG. 38 presents a screenshot of a Pre-populated message in accordance with some of the present embodiments.

FIG. 39 presents a screenshot of a Pre-populated message in accordance with some of the present embodiments.

FIG. 42 presents a screenshot of a Twilio Reporting dashboard in accordance with some of the present embodiments.

FIG. 43 presents a screenshot of a Terms of Service & Privacy Policy SMS message in accordance with some of the present embodiments.

DETAILED DESCRIPTION

Introduction

The present embodiments provide devices, systems and methods to automate some of the time-consuming processes involved with managing projects, such as construction projects, including management of various aspects of those projects, such as management of personnel, equipment, status, and the like. Aspect of this present embodiments support and incorporate a map interface that shows, for example, markers such as pins of projects, equipment, personnel, office locations, and the like. A user interface (UI) could also support a toolbar and list view which allows an administrator to filter, by way of example, the jobs by type, trade, and other schema properties. Each model type could have support for forms and buttons which allow a user to create, edit, update, and delete and be intuitive and user friendly. Additionally, the ability to export reports and changes to the database could be easy to generate and export. The present embodiments can provide floating menus for performing bulk actions on data. Algorithms can be provided for splitting up grouped pins up (e.g., if two pins are at the same address). Two different behavior actions can be provided for every feature. A "classic" action would be using form and fields to assign data and perform actions. The present embodiments also provide "smart/convenient" UI components to leverage force pressing, or quick menus to perform those same actions faster.

Figure 18:
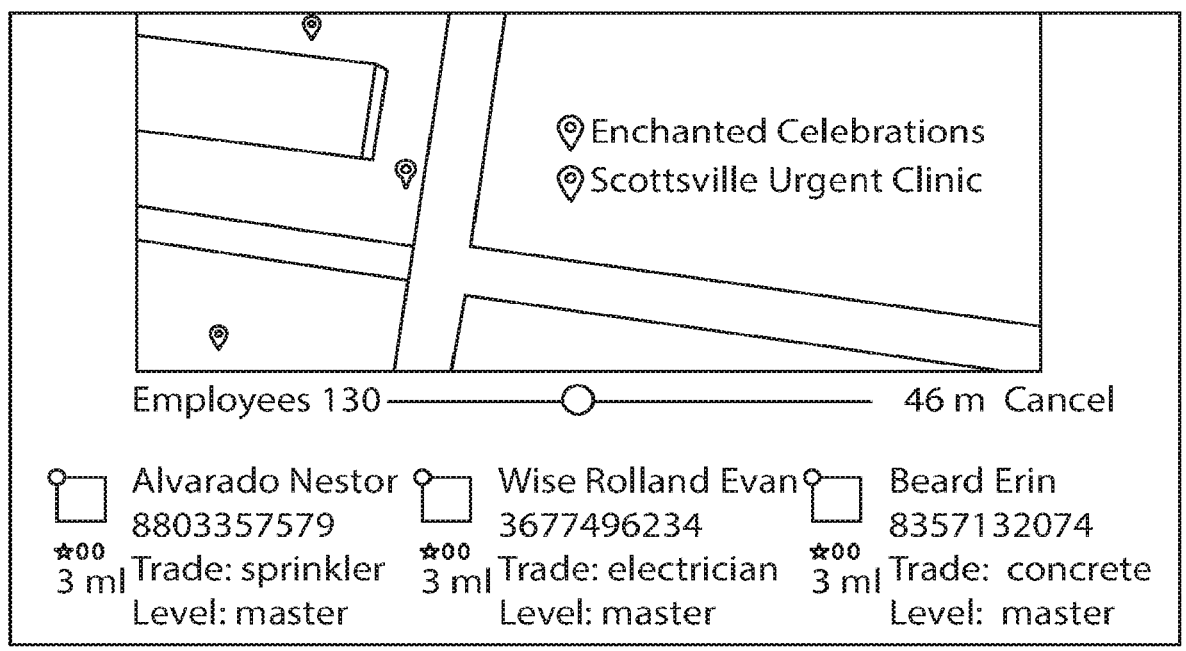
FIG. 18 presents a screenshot of a Radius View in accordance with some of the present embodiments.

The present devices, systems and methods are configured to address, for example: Access Control; Initial admin user setup; Ability to change roles of other users; Display project and office pins on a map; Allow users to search and filter results based upon schema attributes; Allow users to view projects, equipment and office details; Provide managers and admins an ability to filter projects, personnel, offices or equipment; Support deployments and updates ad-hoc from a private server; Sending SMS messages to personnel about changes in Projects or custom alerts, and the like and combinations thereof. See FIG. 18 for an exemplary screenshot of a Radius View.

The present embodiments can have several specific functionalities. An exemplary list could include functionality for: User Registration and Authentication; Navigation, which can include a Main View (which can include a: Map Component, a list Component and a filter Component)' a Report View, and an Activity View; Application Schema; Organization; SMS Notifications: Personnel Detail View; Third-Party Providers; and the like and combinations thereof. Accordingly, summary of each follows.

User Registration and Authentication:

To streamline the setup process and reduce complexity, 'founding' administrative user(s) can be manually created. These founding administrators can have the abilities to:

Change any other user's role to promote or demote that user's access

Invite users to the application with an SMS message
Manually create user logins/password to distribute
Update or Delete user's information such as resetting passwords
Delete their own accounts
Create token-based authentication for logging in to devices Access control can be established with a hierarchy of three different user roles used to enable/disable controls in the application including, for example:
Admin role: who have permission to do all things;
Manager role: who have permission to update certain things like Equipment location; and
User role: who are included in a catch-all role of 'read-only' level for viewing mostly everything else not included in the administrative or manager role.

Roles only change scope if additional ones are added and if they are not defined upon creation. Beyond that, any logic like "this button to edit should only be available to Managers and Admins" is very easy application logic, and thus does not need to be explicitly defined. The roles can be defined in an ACL tab on the Application Schema spreadsheet. Exemplary roles can include:
Supports various roles: Admin, Manager, User;
Allows Admin to C/R/U/D (Create, Read, Update, Delete) Projects, Personnel and Equipment, and the like;
Allows Admins to generate reports;
Allows Project Managers to R/U Projects, Personnel and Equipment; and
Allows Users to Read Projects, Offices.

Navigation:

On some smartphone applications, such as iPhone apps, for example, it is not uncommon to see a full width bar, which contains icons representing various pages or views of the app. In larger device applications such as a computer tablet, in one approach minimal screen real estate can be used for this functional component. According to one approach, a fix set of controls at the bottom of the screen may have four primary 'buttons' for:
Home: which switches to the Main View;
Reports: which switches to the Report View;
Activity: which switches to the Activity View; and
Take Snapshot: which activates a snapshot of the current database.

Figure 19:
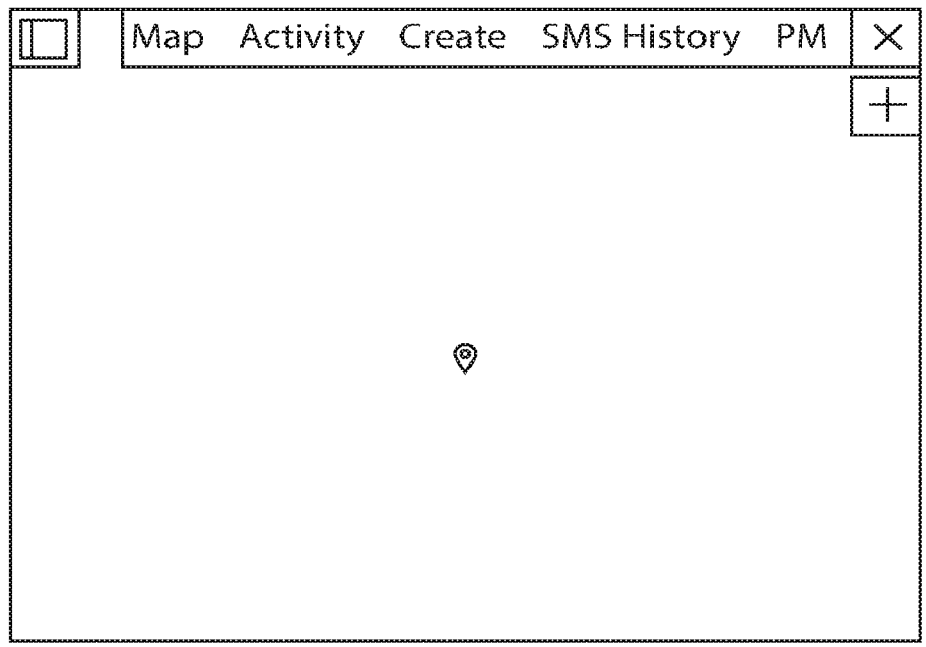
FIG. 19 presents a screenshot of an Options View in accordance with some of the present embodiments.

Accordingly, as mentioned above the application may have three primary views: Home, Reports and Activity. These views can further be broken down into various components and interfaces. It is noted that herein the terms "view," "component," and "interface" are used interchangeably. The views that can be included are, for example: Map (home), Activity, Create, SMS history, and PM (Project Manager) Crew Level View, Reporting, Regional view, Settings. See FIG. 19 for an exemplary screenshot of an Options View.

Figure 20:
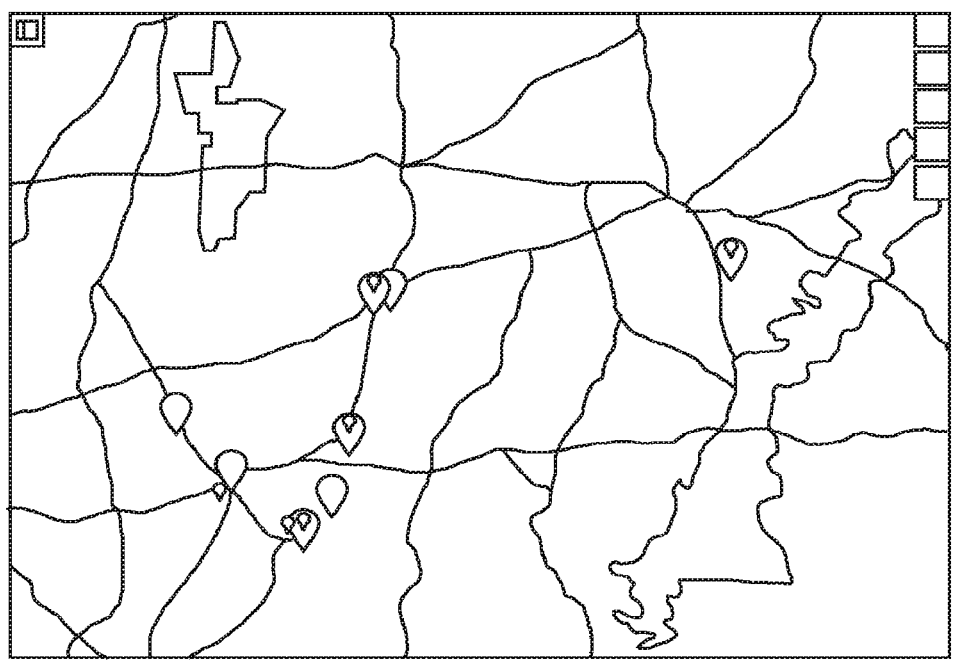
FIG. 20 presents a screenshot of a map in accordance with some of the present embodiments.
Figure 21:
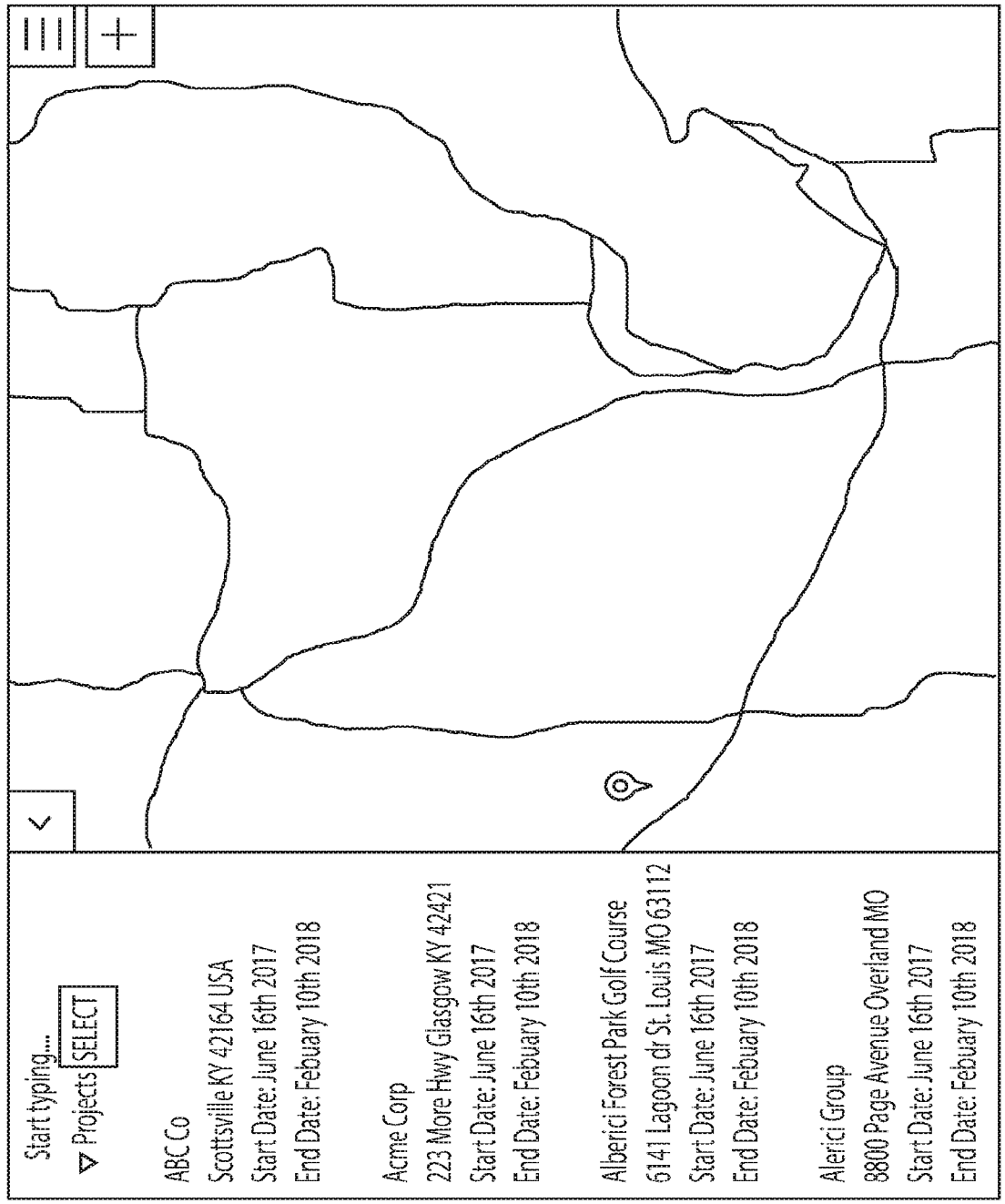
FIG. 21 presents a screenshot of a Project View in accordance with some of the present embodiments.

The Main View can be considered a 'registration' of the application. Once the user registers they will be directed to the Map View, which is the default view that the user sees and as such, should allow and guide the user to other views both from a main navigation and actions within components. The Main View can be divided into various sub-components, for example: a map component, a list component, and a filter component. See FIG. 20 for an exemplary screenshot of a Map View.

The map component refers to things contained on and controlled by the map component. The map component can interface with map services by third-party companies, such as service companies under the tradename of APPLE and GOOGLE. Various other components and interfaces can also interact with the map component. Preferably, the map component view supports:
Pins with a Project Icon and customizable color that represent the Projects on the map
Pins with an Office icon that represent the Offices on the map
Pins with a Personnel icon and customizable color (for example, to differentiate Personnel trade) on the map
Customizable map functionality such as, for example:
Zoom in/out buttons;
Pinch gestures;
Clicking pins shows details;
Toggle view for satellite and vector maps; and
Updating the pins and results based upon zoom level and radius.

Figure 13:
FIG. 13 is one approach a way of providing a box or border around different entities so that they are easy to sort and identify.

The list component, which can also be termed a "list view" or "collection view" provides a more natural display of potentially larger collections of data. When browsing by Project, Personnel, Equipment or Offices, the list view component would show a list of items formatted as "cards" that display meta data and actions grouped together and scrollable. A card view, such as shown, and only by way of example, in FIG. 13 is one approach a way of providing a box or border around different entities (90) so that they are easy to sort and identify. In one approach, fly out menus can be provided on each card with actions such as: Personnel cards allow for Send SMS, Assign to job, Edit Personnel, and Delete personnel. The Project cards allows for Edit project, Radius, and Delete project. The Office cards allow for Edit office and Delete office. Equipment allows for Edit equipment and Delete equipment. See FIGS. 21-26 for exemplary screenshots of a Project View, Edit Project view, Equipment View, Edit Equipment View, Office View, and Edit Office View.
Edit: which would toggle a modal window that allows editing of the Person, Project, and the like;
Delete: which would prompt the user for example "are you sure you want to delete this?";
View on Map: which tells the map view to center on the location of this entity (if available); and
Share: which would allow you to share the entity data via native iOS sharing tools.

Figure 27:
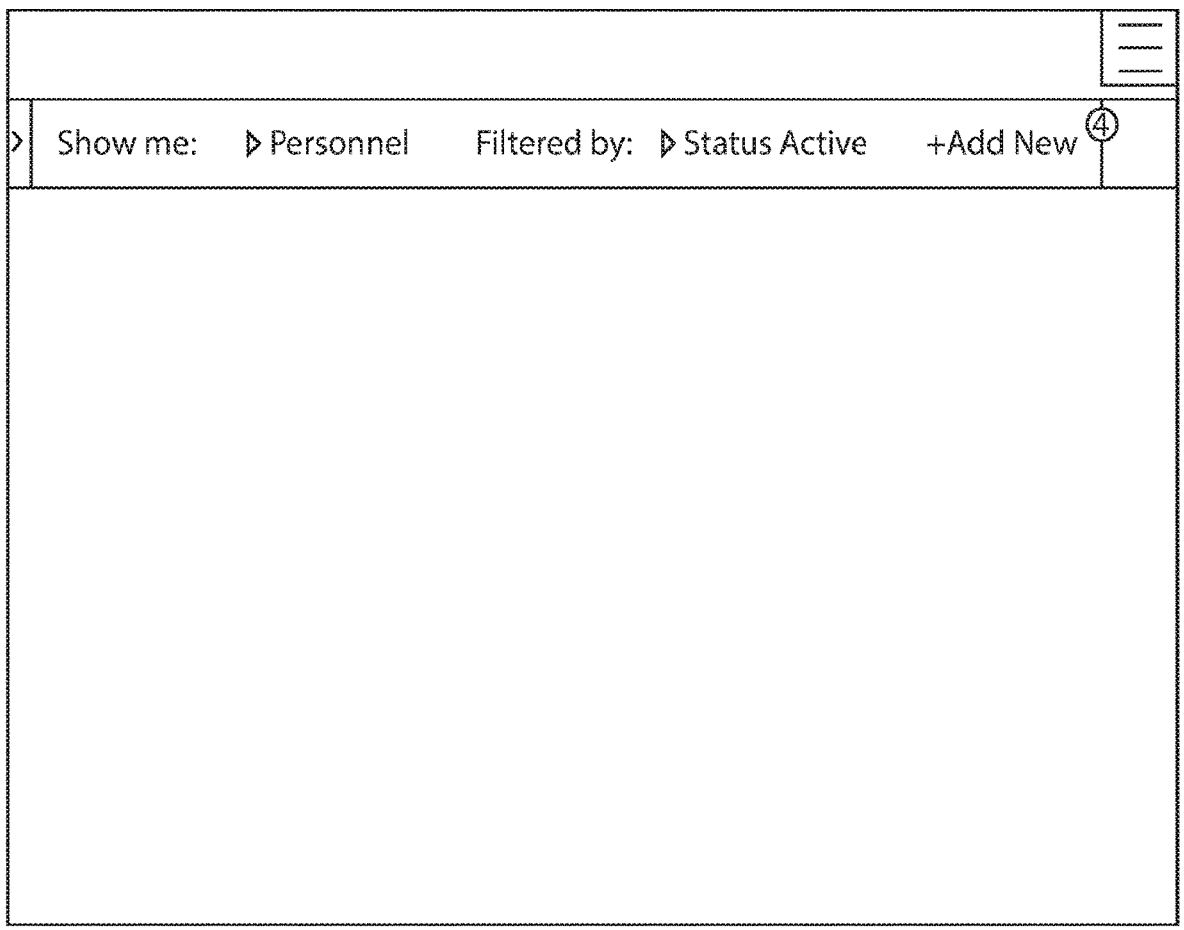
FIG. 27 presents a screenshot of a Toolbar filter in accordance with some of the present embodiments.

Optional features can include a location to Add New, Refresh, and View Changes in this view, for example, as follows:
Add New: a button that shows a modal window to publish a new entity;
Refresh: would manually make a call to the server to synchronize data; and
View Changes: would navigate the user to the Activity View The filter component can be a toolbar fixed, for example, at the top of the screen. This toolbar can have toggles and select fields that allow a user to filter both map and list results when changing the values of these fields. Once filters are applied, the criteria that matches are shown as a number, and then displayed on the map to view the geographic location. See FIG. 27 for an exemplary screenshot of a Toolbar filter.

A view section can be simply labeled as "View" and would then have a number of toggles which could allow a user to update the pins on the map according to which toggles are enabled (i.e., filtered). The list view could also be updated, with the cards grouped and regrouped together by Model type.

<Model> [toggles]
Projects
Offices
Personnel
Equipment

Figure 28:
FIG. 28 presents a screenshot of a filter view in accordance with some of the present embodiments.

See FIG. 28 for an exemplary screenshot of a filter view.

Figure 29:
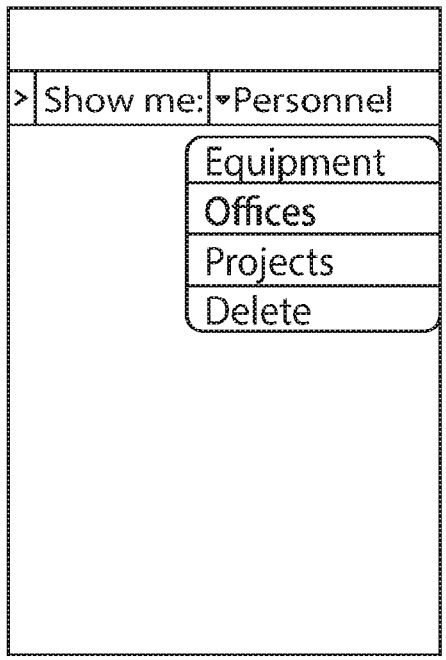
FIG. 29 presents a screenshot of a filter selection views in accordance with some of the present embodiments.
Figure 30:
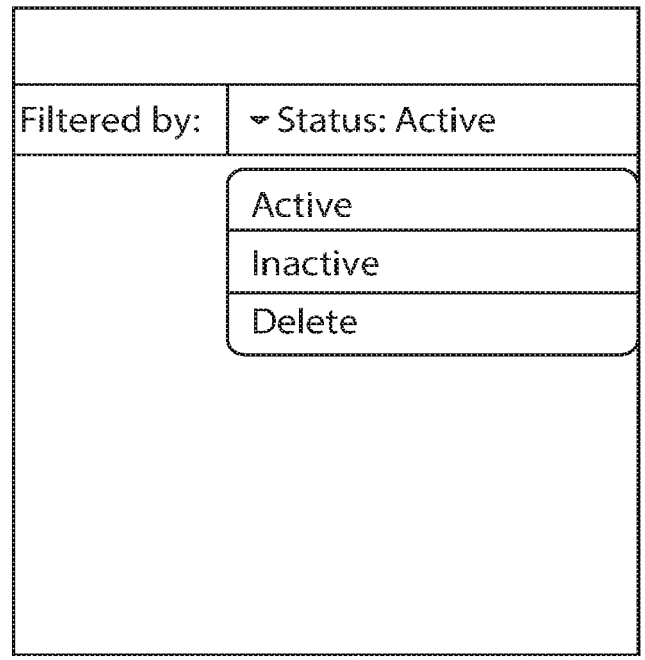
FIG. 30 presents a screenshot of a filter selection views in accordance with some of the present embodiments.
Figure 31:
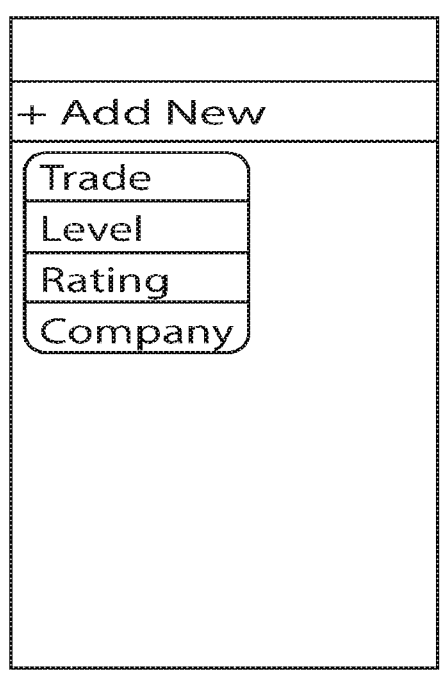
FIG. 31 presents a screenshot of a filter selection views in accordance with some of the present embodiments.
Figure 33:
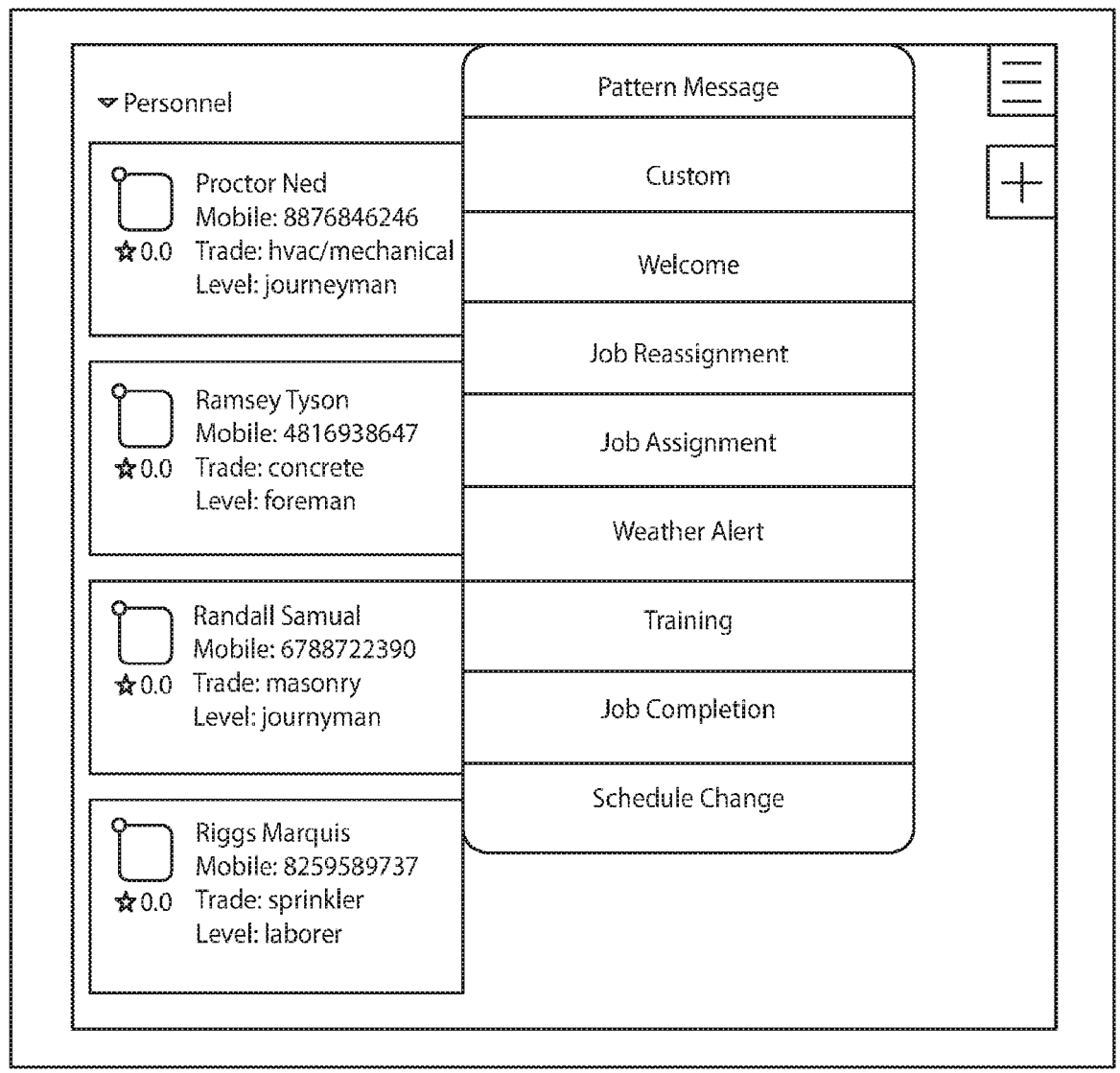
FIG. 33 presents a screenshot of a Pre-populated message in accordance with some of the present embodiments.

The "Filter" section label can offer select fields as defined by the user. Since the Admins can create new select fields, a limit on how many there can be in total could be allowed, but for exemplary purposes status and type can be provided as follows:

Status [select field]—as an example for Projects:
  Active
  Prospect
  Complete
  Archived Type [select field]—types defined by users, but as an example for Projects:
  Concrete
  Masonry
  Carpentry
  Demolition
  Plumbing
  Electrical See FIGS. 29-31 for an exemplary screenshots of filter selections.

The report view can reuse the Filter Component similar to that used for the Map View. This view can also provide a Table Component that shows the results based upon filters such as, for example:

Personnel grouped/sortable/filterable by location, project, status, type, trade and level;
Projects grouped/sortable/filterable by location, status, type;
Equipment grouped/sortable/filterable by location, project, status, type;
Personnel by hire date; AND
Personnel by radius from Project.

Preferably, the embodiments can export the content from this view in some useful manner in a variety of formats such as CSV or PDF.

Figure 14:
FIG. 14 shows an example of an activity timeline according to one approach to the present embodiments.

The activity view is a "go back in time" view. This view can show changes to any data in a timeline complete with what changed and when. This view could contain a sub-navigation that lets a user toggle between seeing the activity in a timeline and viewing snapshots that can be loaded into the application. Users are able to view any changes that have been done in the application. Whether it is adding, changing, or deleting Personnel, Projects, Equipment, or Office. FIG. 14 shows an example of an activity timeline 92. The system could show changes to any data in this timeline, who made the changes and when. See FIG. 32 for an exemplary screenshot of an Activity view.

Application Schema

As an example of the Application Schema a spreadsheet can provide a translation of the Organizations.

Organization

With an onboarding process, the present embodiments can ask the user to either enter a code given to them to join an organization, or to create a new Organization. This allows the embodiments to compartmentalize and relate all data to a single entity. An exemplary organization can have the following schema:

Name
  Data type: string
  Example: Constructors, Inc.
  This will identify the organization to others when sending invite codes
  This is also the main model that is used as the tap root
Personnel
  Data type: has many relationship
  Example: user_ids: [1, 2, 5], admin_ids: [3, 4], manager_ids: [6, 7]
  Each role type could be defined on the database by its name for easier queries
Projects
  Data type: has many relationship
  Example: project_ids: [0, 1, 2, 3]
Offices
  Data Type: has many relationship
  Example: office_ids: [0, 1, 2]

SMS Notifications

The present embodiments can also be configured to provide Short Message Service (SMS), such as one sold under the tradename TWILIO to dispatch SMS messages to users. This allows admins to send mass notifications like "concrete pour is cancelled today" and send to all finishers for example. This can also be used when switching personnel from different jobs to alert them that they will be starting the job and same details that are pre-populated in the message. The present embodiment could also track message history along with delivery status and acknowledgement. Multiple predetermined responses are available within the application, that allow users the instant ability to send scenario-based messages to their team. For example, responses for: Welcome, Job Reassignment, Job Assignment, Weather Alert, Training, Job Completion, Schedule Change, as well as custom messages not include in the canned ones may be provided. See FIGS. 33-39 for exemplary screenshots of pre-populated messages.

Figure 40:
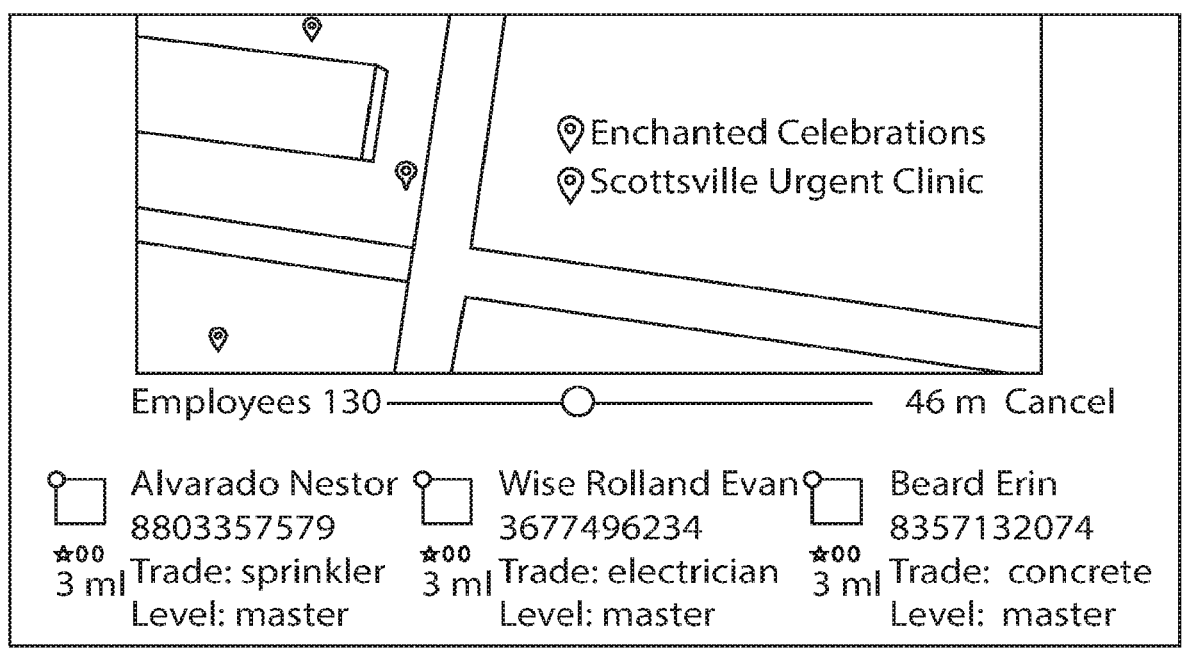
FIG. 40 presents a screenshot of a radius search in accordance with some of the present embodiments.

The present embodiments can provide a user to "Text Blast" based on selected criteria and filtering. For example, a user can text-blast an employee data base that exists within the application. For example, the data base can provide the user with a visual geographic location of an employees' domicile. This enables the user to locate resources that are closest proximity to a project or a work location. This allows the user to quickly locate all resources near the project site and communicate with employees efficiently by text messaging. This text provides notifications to many employees (up to thousands) at one time. This works by allowing a user to search for personnel for a project based on their domicile, within 100 miles from a specific project. Once the radius filter is applied, they can select the number of users they want to send a Job Assignment canned/exemplary SMS to, and blast message to that entire filtered group. See FIG. 40 for an exemplary screenshot of a radius search.

An example SMS Text communication could be provided to say, hundreds for example, of employees in the data database within 50 miles of an anticipated, upcoming project:

"Good afternoon, this is John Doe, Superintendent for Constructors, please be advised our firm is pursuing (or has been awarded) a project located at Jobtown, Michigan, the project name is Project X, we are looking for Carpenters, Laborers, Operators, and Cement Finishers who want to work on this project. The project Starts Jun. 1, 2018 and will last for approximately ten (10) months. Please give me a call or text back to discuss this opportunity. Thank you."

Alternately, a user can touch and drag and then communicate by SMS text the movement of active resources located at project sites or work locations. This tool uses mapping and SMS text functions to move resources from location to location or project to project. Resource movements are made by touching a project, then touch an employee from a drop-down type menu, then dragging an employee or resource to another location. A text can be sent to the employee and other necessary recipients after the drag movement is complete. Multiple users receive the same text communications for coordination within the company. This function allows the user to touch and drag people and other resources from one job to another on the screen while simultaneously sending a text. From the project management view, users are able to drag a select number of personnel into the project and send an SMS blast from the application. Users will also receive the incoming texts from recipients and view them in their filter SMS tab. For example, the text could read:

"This is Superintendent John Doe. This message is for Franklin Smith, Fred Smith, Steve, John, Etc., Carpenters, currently assigned at the Hospital Carpentry Project, Tomorrow, Apr. 23, 2018, please go the Project X located at 12354 Acme Blvd., Lansing MI. Please start at 7:00 AM, park at the parking structure located at 333 West Randolph St., Lansing MI 48190."

Figure 41:
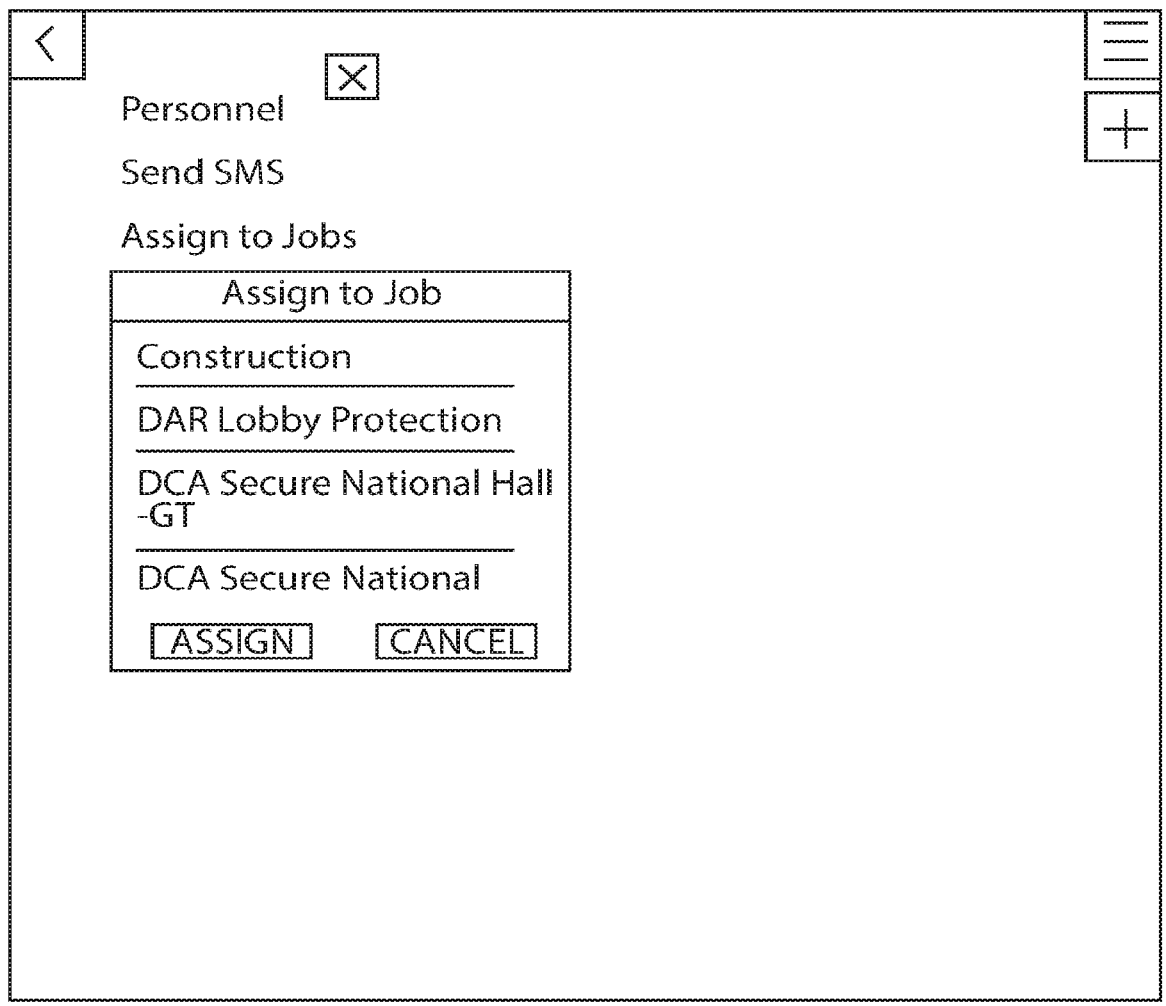
FIG. 41 presents a screenshot of a job assignment option in accordance with some of the present embodiments.

See FIG. 41 for an exemplary screenshot of a job assignment option.

The present embodiments can send a text to all recipients, superintendents, and other required parties. The SMS Text recipients can send back an acknowledgement and confirmation. A report can be run at the end of the day and all un-acknowledged texts can be provided in a report to the user for follow up communication. The report is run using the Twilio dashboard, where you can see if there were errors, who received the message, and who responded. See FIG. 42 for an exemplary screenshot of a, e.g., Twilio Reporting dashboard.

Current embodiments can use SMS technology where a message can only contain 160 characters, anymore and it will be split off into two messages. The message can contain a trigger word such as, YES/NO. A second message can be sent if the person says YES (EX. Type yes to confirm receiving text messages). Recipients of the SMS can also choose to stop messages by responding with (STOP), as well as view the Project Manager Terms of conditions, and Privacy Policy by responding with (TOS or PP). See FIG. 43 for an exemplary screenshot of Terms Of Service & Privacy Policy SMS message.

Personnel Detail View

Figure 44:
FIG. 44 presents a screenshot of a Personnel Detail View in accordance with some of the present embodiments.

When clicking on a personnel card, one of the actions of the embodiments can be to show a modal of the personnel details. In this window, full contact details, private user notes about the person, and SMS message history, and the like can be shown. The Activity/Notes section is where a user can enter in private notes about the personnel. See FIG. 44 for an exemplary screenshot of a Personnel Detail View Screenshot.

Third-Party Providers

The present embodiments can also be configured to seamlessly incorporate functionality provided by third-party providers. Exemplary third-party providers can be those operating under the service name FIREBASE and TWILIO. Functionality provided by third-parties can include custom servers and databases as a Platform-as-a-Service (PaaS) can provide tools necessary for syncing between devices, user authentication, and having a centralized location for a remote database. Functionality provided by third-parties can also include two-way SMS messaging and status reporting on messages as a service. Project updates can also be provided as SMS message. In addition, the API (Application Program Interface) can be checked to report on the health and responses of messages to update the database and application to show read receipts and acknowledgements.

Thus, at a high level there are several core features and functionality that can be provided by the present embodiments such as Authentication; Geographic Project Management; and Centralized Messaging. During Authentication, Users can login and register with their pre-provided e-mail and telephone number. If a telephone number is "claimed" by an organization, they can automatically be affiliated or granted low-level access with that organization. Account management can be employee controlled and updates everywhere within the system. Users can update contact information, which can propagate to other systems such as payroll, and the like. Accounts can have various roles and access. Users access is predetermined by the Project Manager group. When they are given credentials for the application the level of access is already determined. For example:

Developer—has admin rights and additional debugging tools

Admin—has rights to view/edit/delete any content, and perform all actions

PM (Project Manager)—has rights to message employees, view resources scoped by job, and send alerts Employee—has rights to update their own profile and receive alerts The feature of geographic Project Management provides many advantages over systems known in the art. Resources (personnel, equipment, offices, etc.) can be content managed. This gives PM's (Project Manager) and Admins the ability to easily update resources, such as employee contact details, or adding new equipment to the database.

Visually identifying resources and location are now possible. By using colors and iconography to differentiate resources and types, admins can to quickly identify inefficiencies between personnel, equipment and jobs. For example, as to equipment resources, if a company has only one Cement Truck, and that truck is needed at multiple locations ("Job A" and "Job B") on the same day, the PM (Project Manager) of "Job A" can quickly identify where the truck is and roughly estimate the time it would arrive at his location, based upon distance and estimated time to complete a task. For example, as to personnel resources, if a company is starting a new job, it may not be easy to identify potential personnel based upon city or address alone, unless this information is plotted on a map, and geo-constraints and searching can be applied. The present embodiments allow the user to identify and filter personnel based upon proximity to any geolocation. This is done using a radius search function.

Figure 45:
FIG. 45 presents a screenshot of a pin accordance with some of the present embodiments.

Resources can be filtered by type, trade, and many other attributes under the current embodiments. When viewing the map, a user can easily filter pins (which represent resources) using a full screen menu that shows unique attributes to that resource and the available options represented by each. The present embodiments use a novel design to select fields and forms handled in iOS applications. The menu is designed to be toggled and collapsed by either the left or right hand. The menu of the present embodiments is built to dynamically show additional attributes and values based upon changes to the raw data, rather than predefined values. This allows admins to control filtering options, rather than a programmer. Users can view the map and see where Personnel, Offices, Projects, and Equipment are currently located. Users are able to click on specific colored tabs and view the cards of those categories. Based on viewing the card, a user is able to use drop down options to select and apply actions to that card. See FIG. 45 for an exemplary screenshot of a pin.

The present embodiments also provide Centralized Messaging. Admins and PM's (Project Manager) can send and receive messages with personnel. This functionality is made possible using the TWILIO API (Application Program Interface for SMS messages and native iOS and Android notifications. This allows management roles to send announcements en masse and receive responses. Management roles can also see message history and statuses. A manager can view message history with any employee, along with, for example, the delivery status and/or acknowledgement of messages. This has benefit for both auditing and efficiency and is unique to any application known in the art. SMS filtering allows for Project Managers (PMs) to view their own messages, as well as all the messages that are coming through the application.

Figure 1:
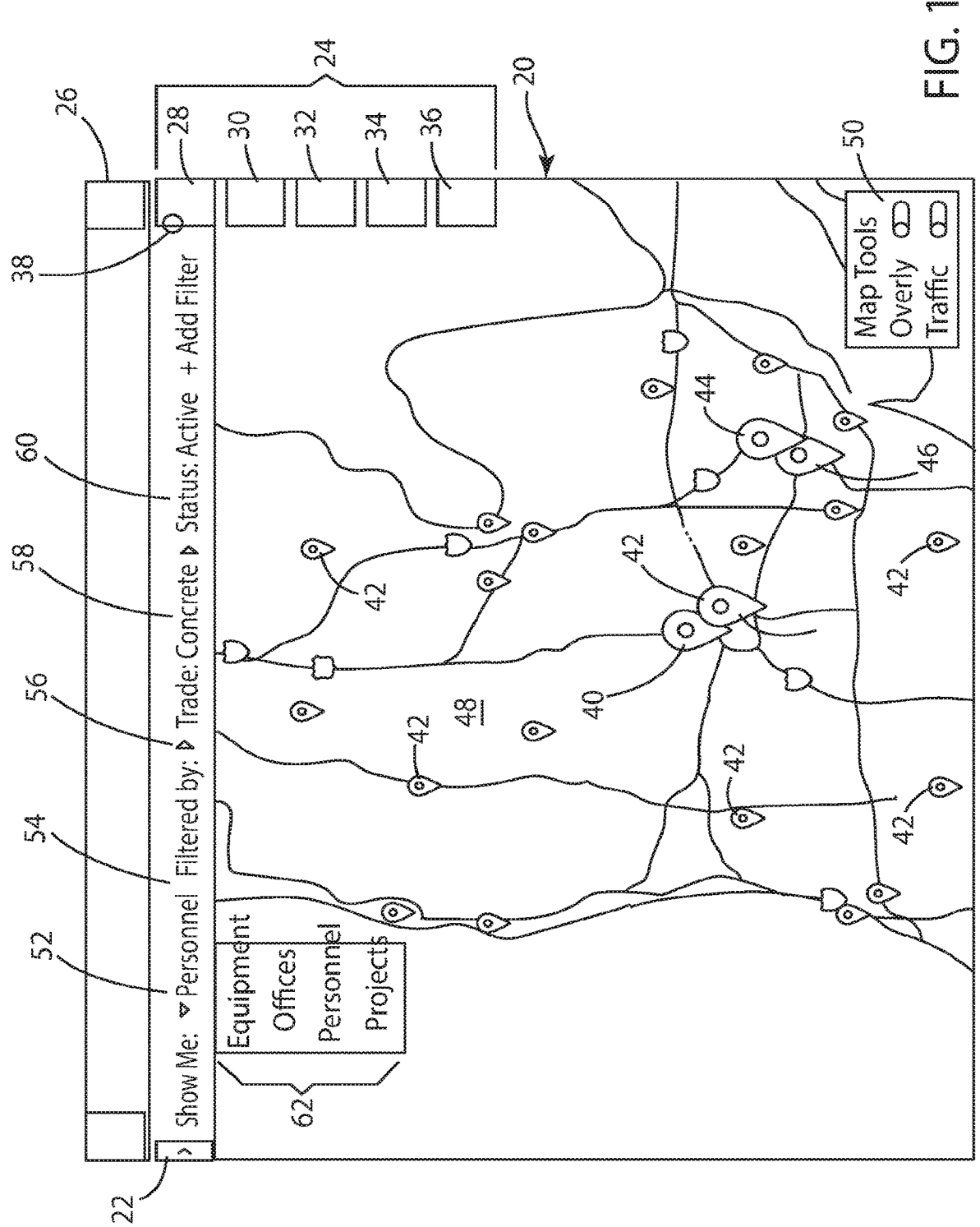
FIG. 1 illustrates a diagram of a Main View Map of a user interface according to one approach to the present embodiments.

Turning now to the Figures, FIG. 1 illustrates a diagram of a Main View Map of a user interface according to one approach to the present embodiments and is generally indicated at 20. As shown, a pull-down menu 22 is activated with a side button is toggled on, here for personnel 28. The toggle buttons for personnel 52 filtered (54) by trade 56, status 58, and add filter 60. As shown in FIG. 1 trade 56 is concrete (other options could be: carpentry, demolition, plumbing, masonry, add trade and the like). Status 58 is active (other options could be: laid off, terminated, add status). Personnel 52 is selected for Show Me 22 among options 62 of Equipment, Offices, Personnel and Projects.

Button 26 is the 'hamburger' button to show main items from the home page of the application. Side button location filters can also be present for personnel 28, project sites 30, equipment 32, offices 34, and additional filters 36. Bubble 38 can provide the number of pins for that selected filter ('20' are shown). As shown in FIG. 1 for example, 144 personnel 28 are located on map 48, indicated as pin 42. Office pins 40 and project site pins 46 can also be added. In use, hoovering the pointer over a pin with launch a block with information specific to the pin type. Additionally, pin type color can be different for different status of a filter item. For exemplary purposes only, the pin 42 for personnel could be green for active, yellow for laid-off, and red for terminated. Number 54 can be included for the number of identified filtered items within a preselected pin area. Block 50 can provide map tools to toggle on and off, such as overlays and traffic.

Figure 2:
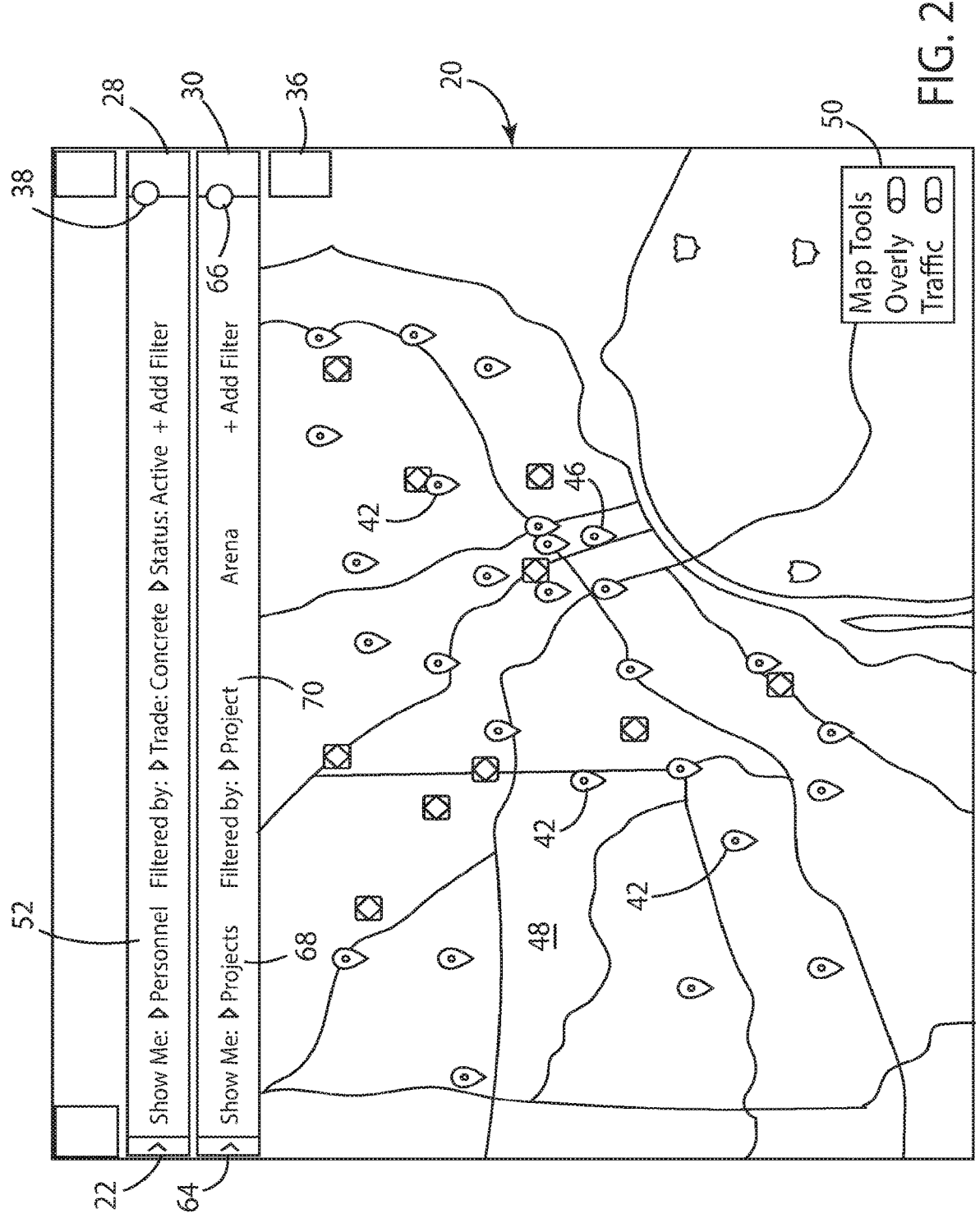
FIG. 2 illustrates a diagram of a Main View Map of a user interface according to one approach to the present embodiments with applied filters for personnel active in the concrete trade and projects filtered by specific project.

FIG. 2 illustrates a diagram of a Main View Map of a user interface according to one approach to the present embodiments with additional applied filters for personnel active in the concrete trade and projects filtered by specific project. In drawer 64, project filter 68 is filtered for project ARENA 70, which can be shown as 46 using the same color and/or symbol 30 used on the side buttons. As shown, side button 30 shows the total number of projects filtered as '1' at 66. It is again noted that that the actual number and location of the pins would depend on matches from the database where addresses are known and within the selected visible map view. As the map view is zoomed in or out or moved, the pins (e.g., pins 40, 42, 44 and 46) can be regrouped or dropped on or off if they are no longer within the visible map portion. Corresponding totals 38 and 66 are also revised as the map is resized or repositioned.

Figure 3:
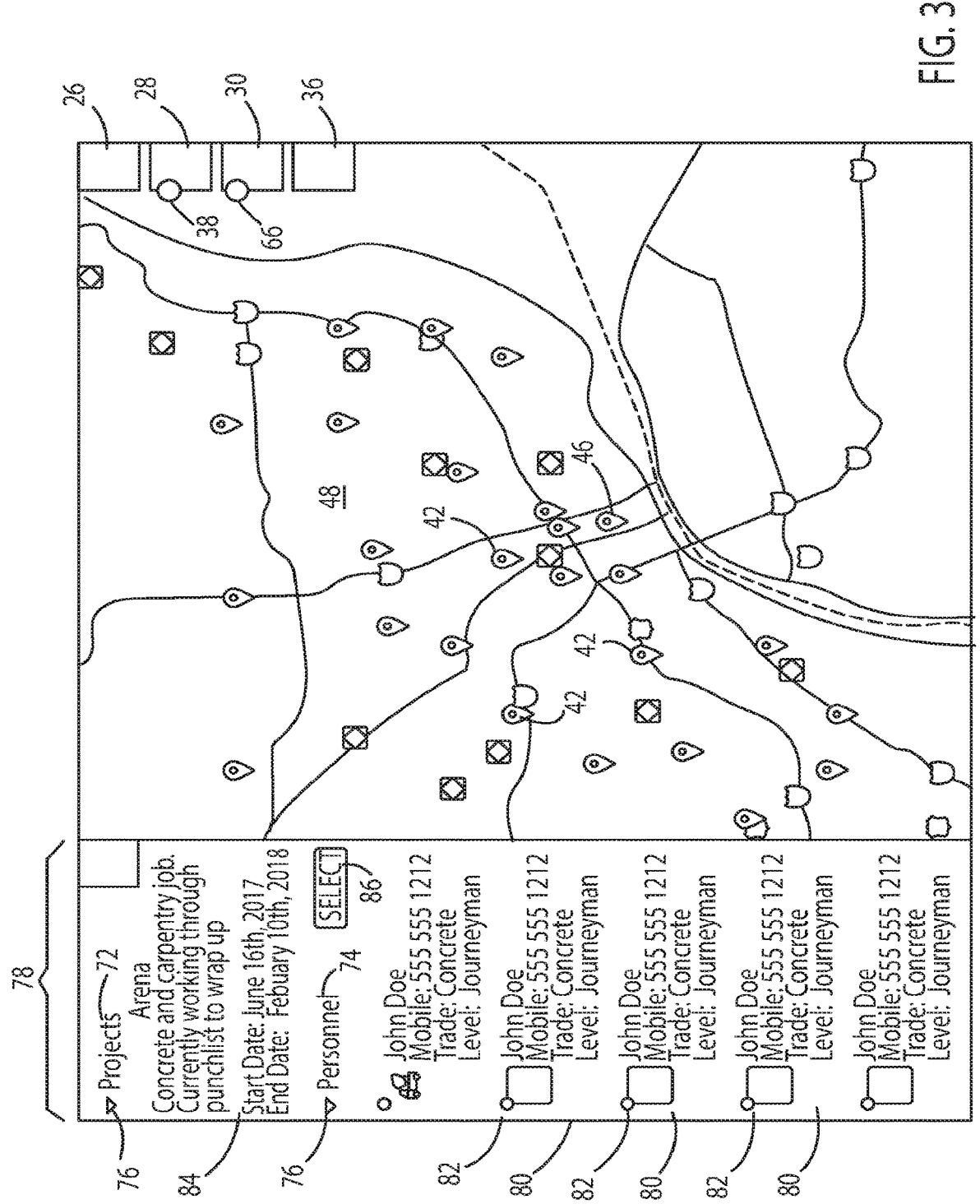
FIG. 3 illustrates a diagram of a Main View Map of a user interface according to one approach to the present embodiments with applied filters for personnel active in the concrete trade and projects filtered by specific project and showing specific content of the filtered criteria of project and personnel of FIG. 2.

FIG. 3 illustrates a diagram of an optional Main View Map of a user interface according to one approach to the present embodiments with applied filters for personnel active in the concrete trade and projects filtered by specific project and showing specific content of the filtered criteria of project and personnel of FIG. 2. This drawer view 78 lists project 72 (showing project 84) and personnel 74 (showing personnel 80 accompanied by their status 82) and has an accordion arrow 76 to collapse the list. Personnel list 74 also has a 'SELECT' button 86 to allow a user to select certain records for further action (e.g., to delete, flag, SMS text blast, and the like).

Figure 4:
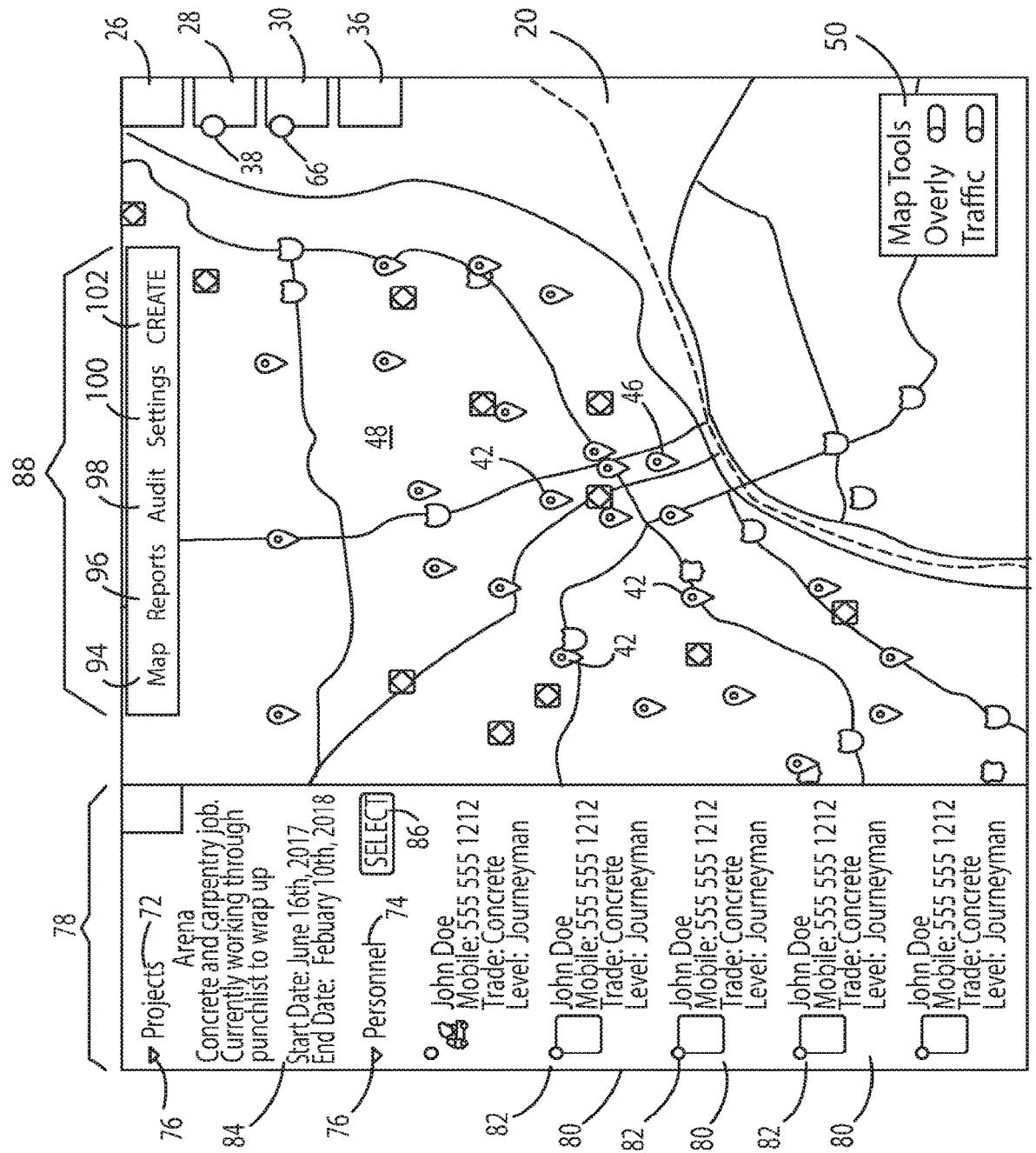
FIG. 4 illustrates a diagram of a Main View Map of a user interface according to one approach to the present embodiments with applied filters for personnel active in the concrete trade and projects filtered by specific project and showing specific content of the filtered criteria of project and personnel of FIG. 3 and the pull-down menus to toggle between the Map, Reports, Audit, Settings and CREATE.

FIG. 4 illustrates a diagram of a Main View Map of a user interface according to one approach to the present embodiments with applied filters for personnel active in the concrete trade and projects filtered by specific project and showing specific content of the filtered criteria of project and personnel of FIG. 3 and the available pull-down menus 88 to toggle between the Map 94, Reports 96, Audit 98, Settings 100 and CREATE 102.

Figure 5:
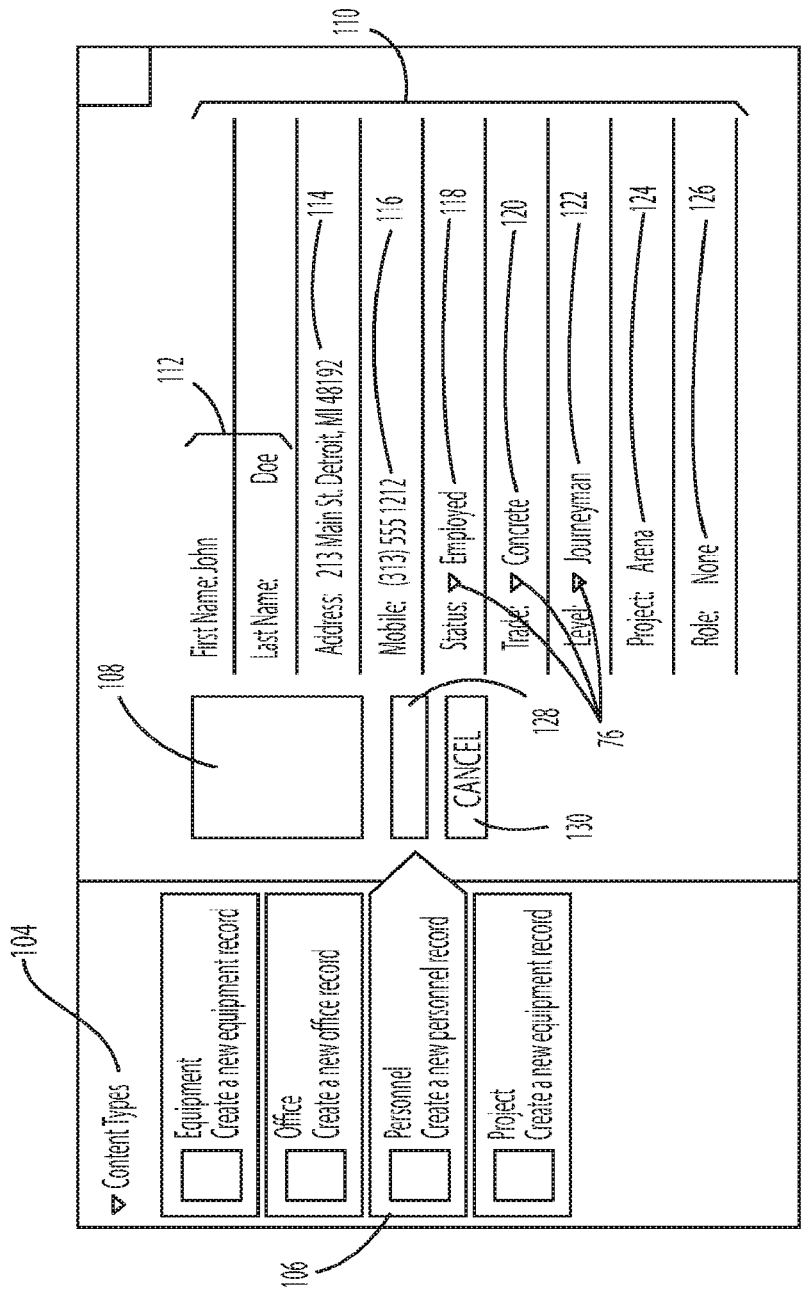
FIG. 5 illustrates a diagram of a Content type side menu of user interface according to one approach to the present embodiments having content types for Equipment, Offices, Personnel and Project, with Personnel selected.

FIG. 5 illustrates a diagram of a Content type side menu 104 of the user interface according to one approach to the present embodiments having content types for Equipment, Offices, Personnel and Project, with Personnel 106 selected. An icon or image 108 of the personnel can be part of the record as well as several of data points that can be selected in the filtering steps, such as name 112, address 114, telephone number 116 (mobile preferred for text blasting; employment status 118; trade; skill level 122; project assignment 124 and role 126. It is noted that accordion arrows 76 allow editing of the record and to see selection choices within each filter criteria. It is also noted that the specific filtering criteria shown are exemplary only and can be revised and expanded to include any number of filtering criteria and lists of choices within each filter criteria. If a record is edited it can be either saved using the SAVE button 128, or the CANCEL button 130.

Figure 6:
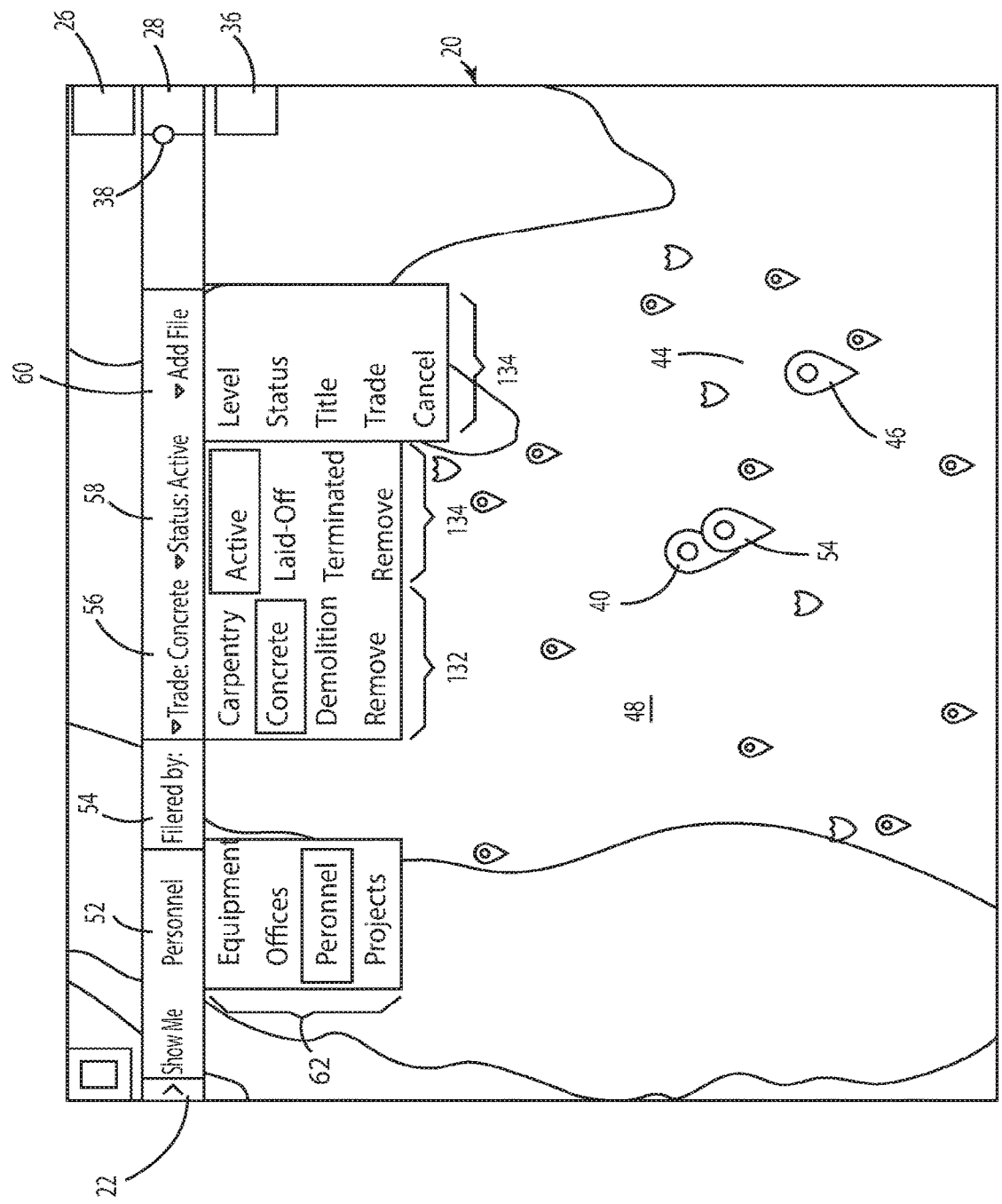
FIG. 6 illustrates a diagram of a Main View of a user interface according to one approach to the present embodiments with applied filters for personnel active in the concrete trade shown by multiple pull-down lists to toggle on and off.

FIG. 6 illustrates a diagram of a Main View of a user interface according to one approach to the present embodiments with applied filters for personnel active in the concrete trade showing the multiple pull-down lists to toggle on and off and to select within each list. Thus, list 62 for personnel 52, filtered by list 132 for trade 56; list 134 for status 58 and list 136 to add filter 60.

Figure 7:
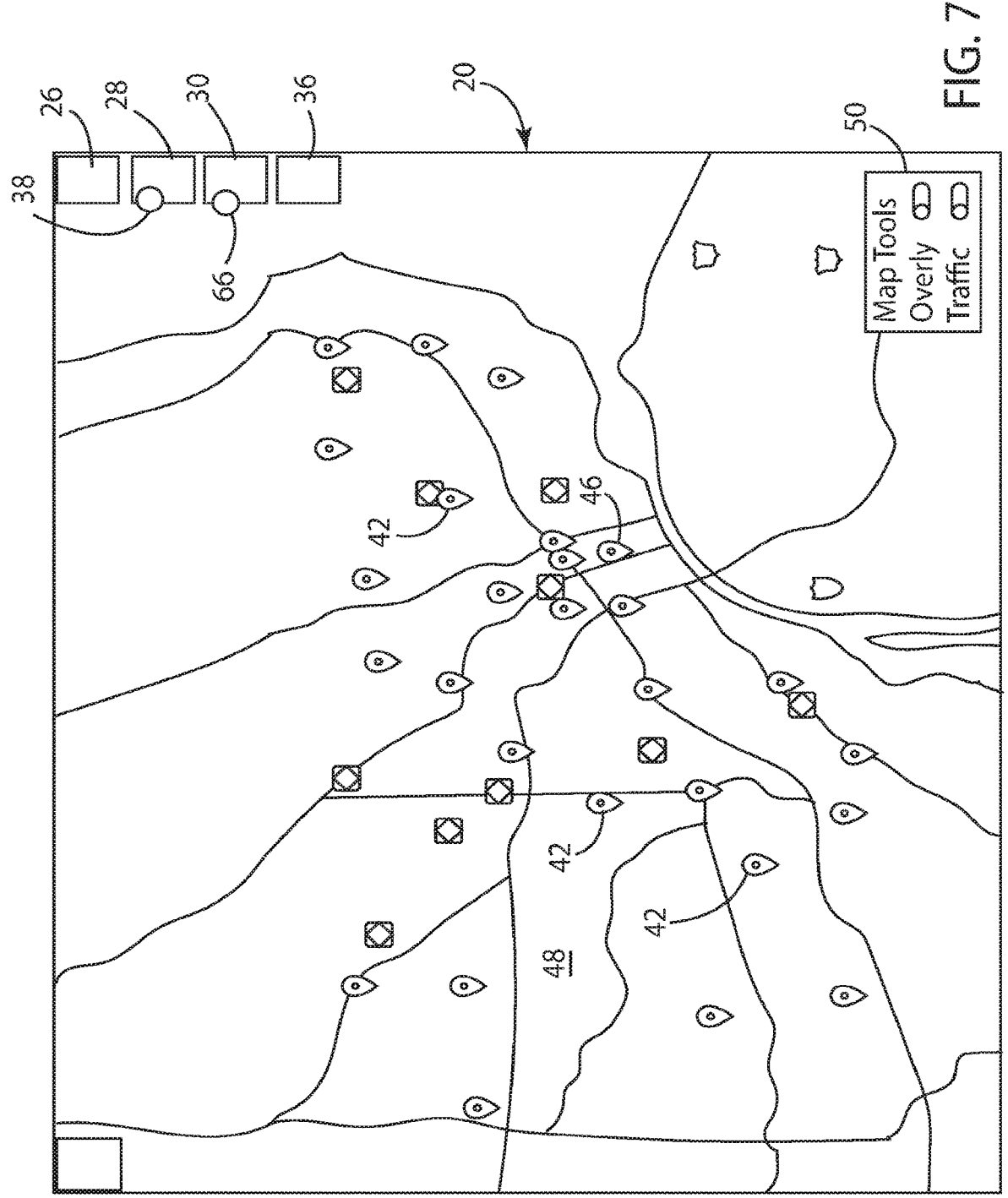
FIG. 7 illustrates a diagram of a Main View Map of a user interface according to one approach to the present embodiments with applied but hidden filters.

FIG. 7 illustrates a diagram of a Main View Map of a user interface according to one approach to the present embodiments with applied but hidden filters.

Figure 8:
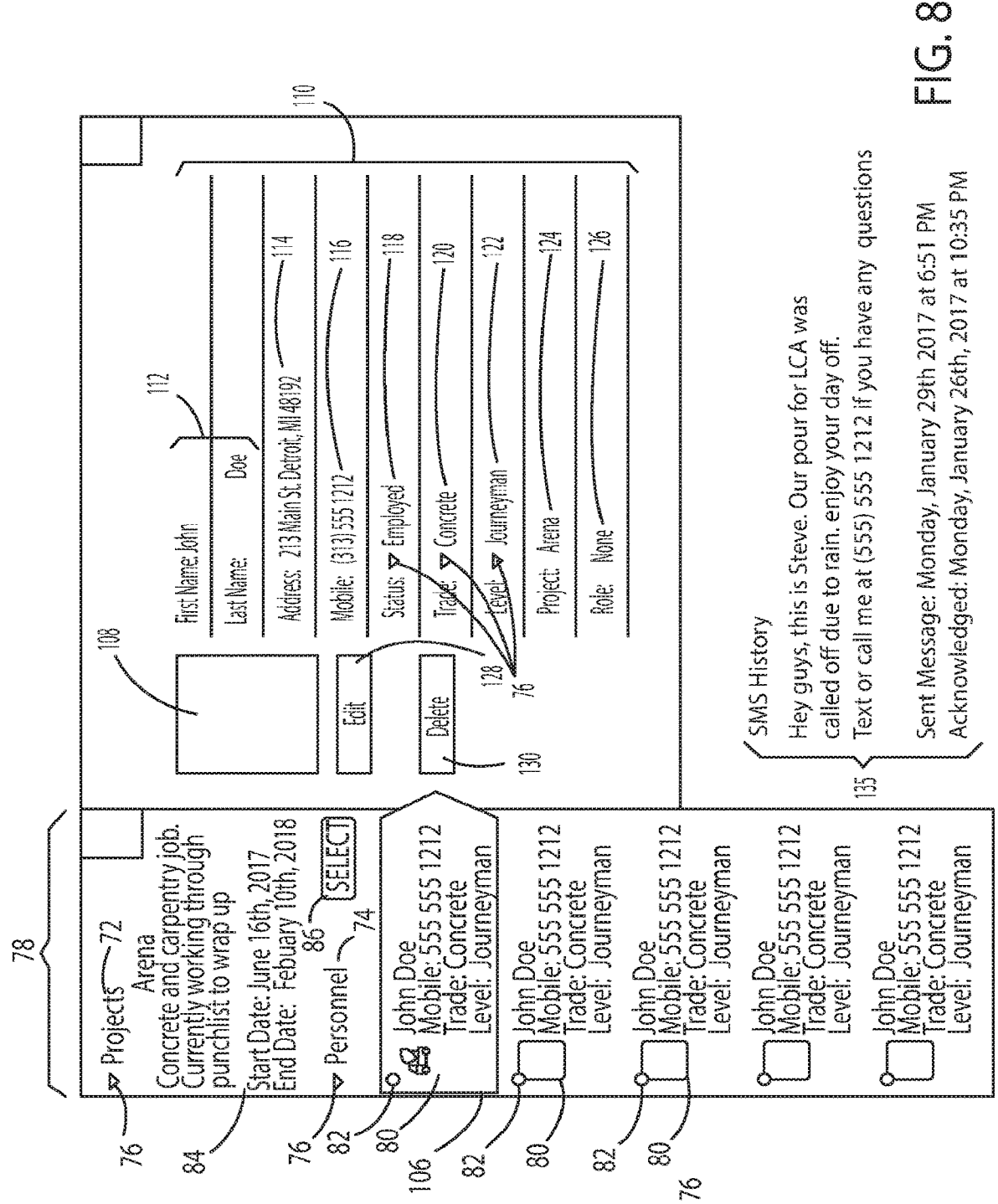
FIG. 8 illustrates a diagram of a personnel list according to one approach to the present embodiments filtered by active concrete trade at the journeyman level, with a selected/highlighted person showing personnel record and SMS history.

FIG. 8 illustrates a diagram of a personnel list according to one approach to the present embodiments filtered by active concrete trade at the journeyman level as in FIG. 4 and FIG. 5, with a selected/highlighted person showing personnel record and SMS history 138.

Figure 9:
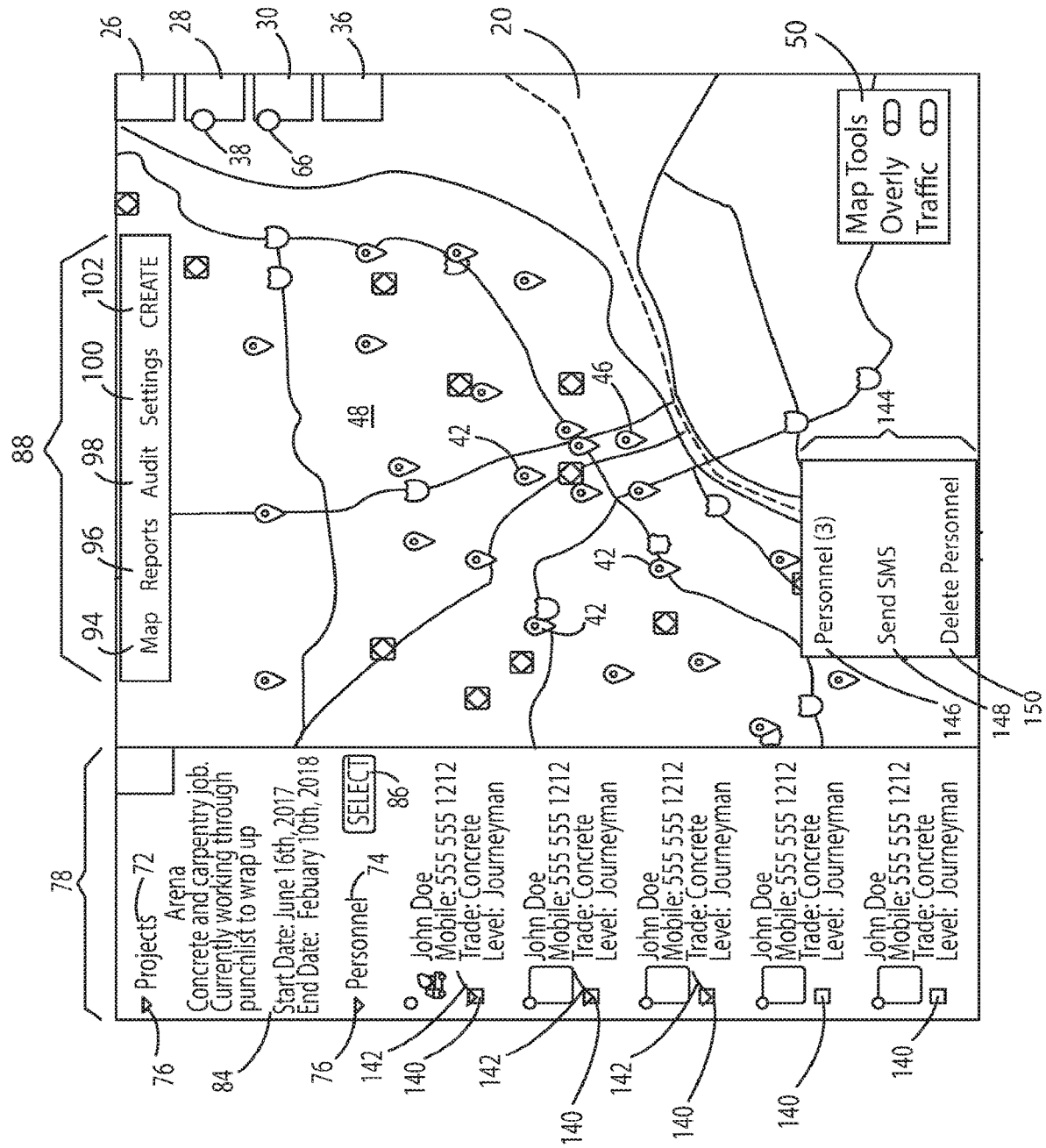
FIG. 9 illustrates a diagram of a Main View Map of a user interface according to one approach to the present embodiments with applied filters for personnel active in the concrete trade and projects filtered by specific project and showing specific content of the filtered criteria of project and personnel with three selected and the option to delete or send a SMS.

FIG. 9 illustrates a diagram of a Main View Map of a user interface according to one approach to the present embodiments with applied filters for personnel active in the concrete trade and projects filtered by specific project and showing specific content of the filtered criteria of project and personnel with three selected and the option to delete or send a SMS. As shown, SELECT button 86*i* is toggled on, which generates a display of a check box 140, where a user can click to select a record which is evidenced by a 'check' 142. Toggling the SELECT button at 86*i* also generates an action box 144 to show selected personal record count 146; a button to select a SMS 148, and a button to select 'Delete personnel' 150. In some embodiments, clicking the pin for personnel could also select the list to receive further action, such as a text. In this manner, in either approach, the user can not only quickly determine the right people for further action, but also the user can be geographically selective to find those qualified personnel closest to the selected job site. Other similar features can be implemented to contact schedulers for equipment.

Figure 10:
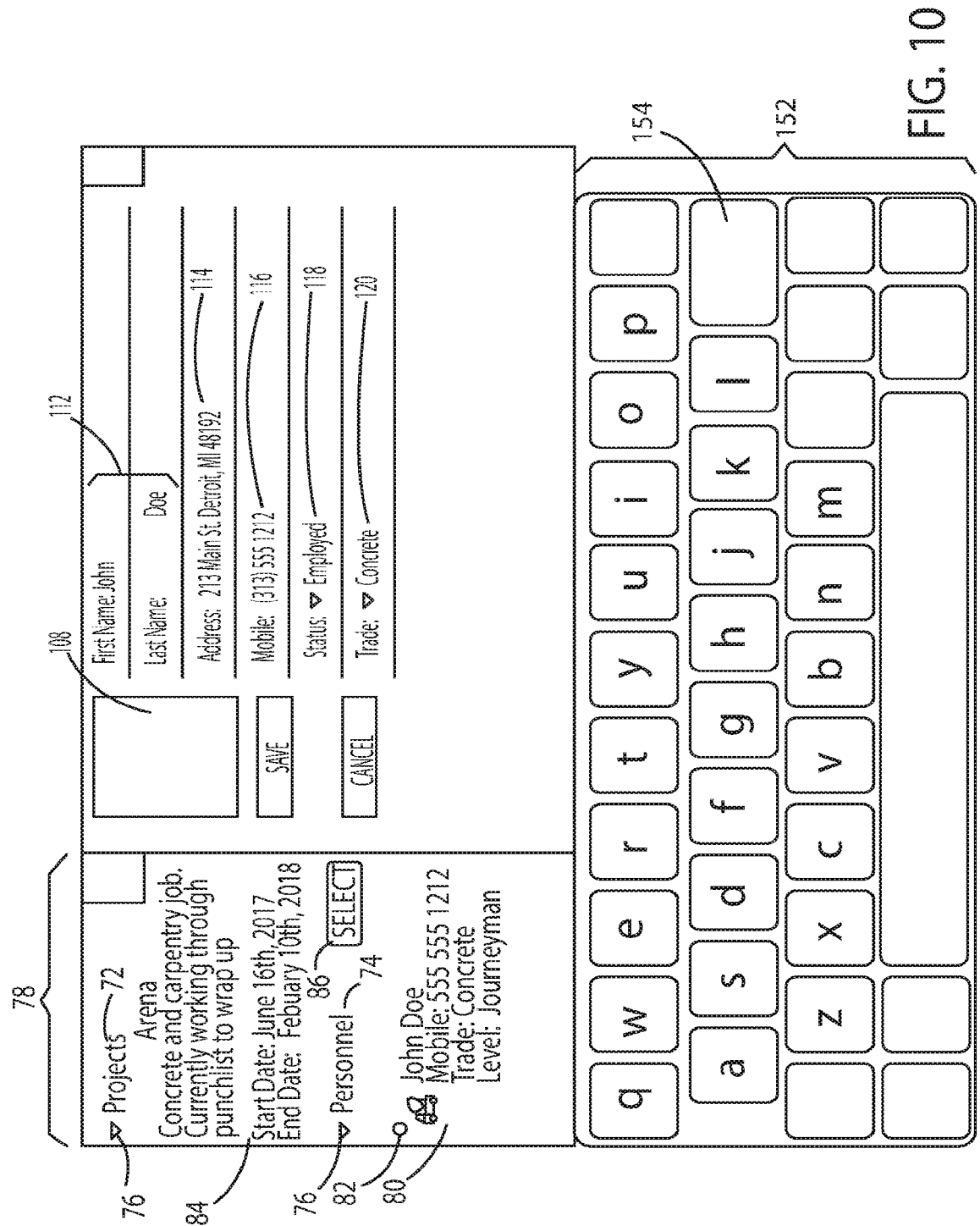
FIG. 10 illustrates a diagram of a personnel list according to one approach to the present embodiments filtered by active concrete trade at the journeyman level, with a keyboard overlay to write a SMS of a selected/highlighted persons selected to receive a SMS.

FIG. 10 illustrates a diagram of a personnel list according to one approach to the present embodiments filtered by active concrete trade at the journeyman level, with a keyboard overlay to write a SMS of a selected/highlighted persons selected to receive a SMS. Accordingly, if the Send SMS button 148 is clicked, keyboard 152 will appear which the user can type in the SMS and then click the DONE button 154.

Figure 11:
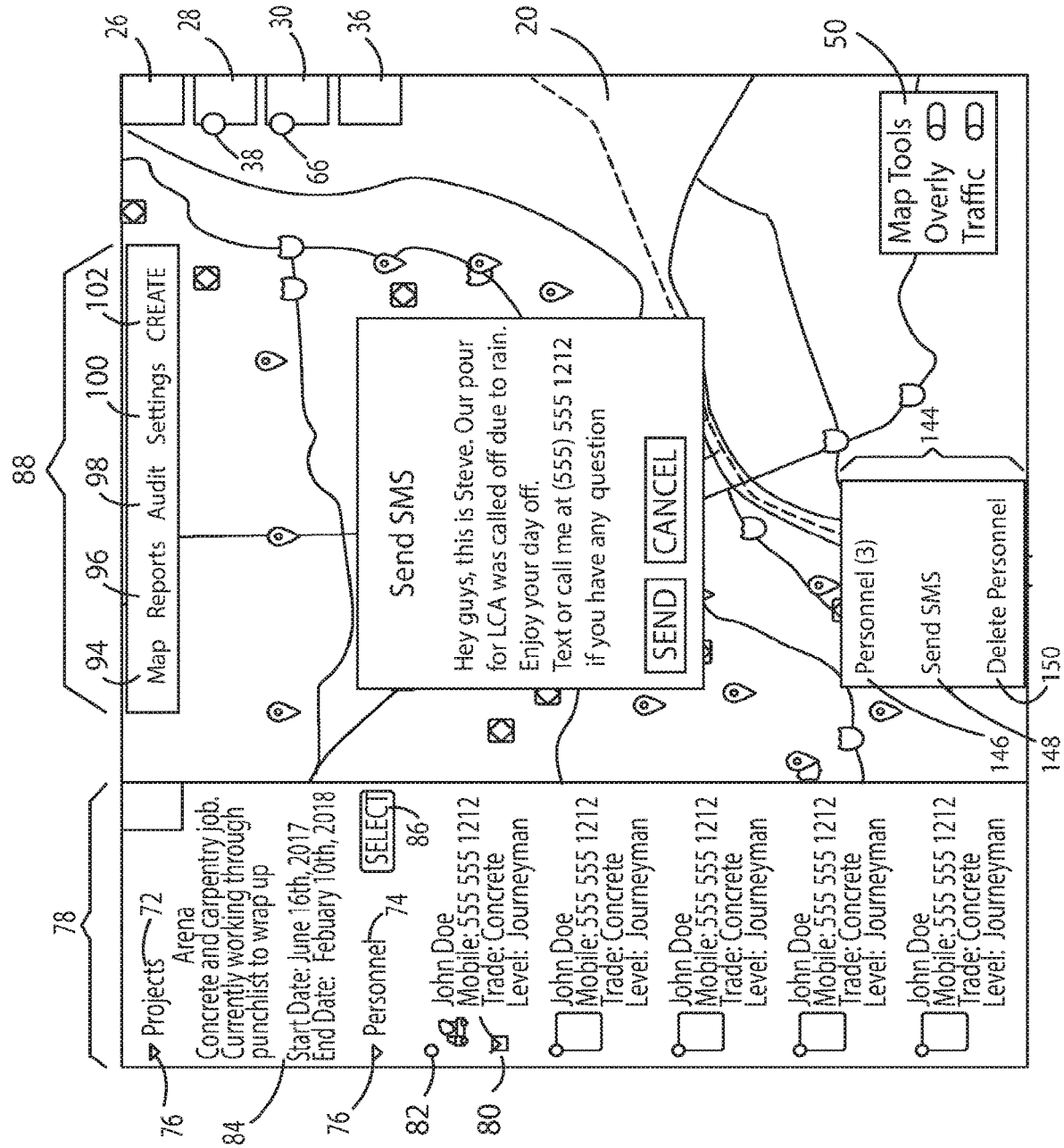
FIG. 11 illustrates a diagram of a Main View Map and a personnel list according to one approach to the present embodiments filtered by active concrete trade at the journeyman level, with an SMS entered and ready to send.

FIG. 11 illustrates a diagram of a Main View Map and a personnel list according to one approach to the present embodiments filtered by active concrete trade at the journeyman level, with an SMS entered and ready to send. A preview block 156, shows the types SMS text 158 which the user can send clicking the SEND button 160 or cancelling with the CANCEL button 162. Thus, this allows the user and the texted personnel to communicate quickly and efficiently.

Figure 12:
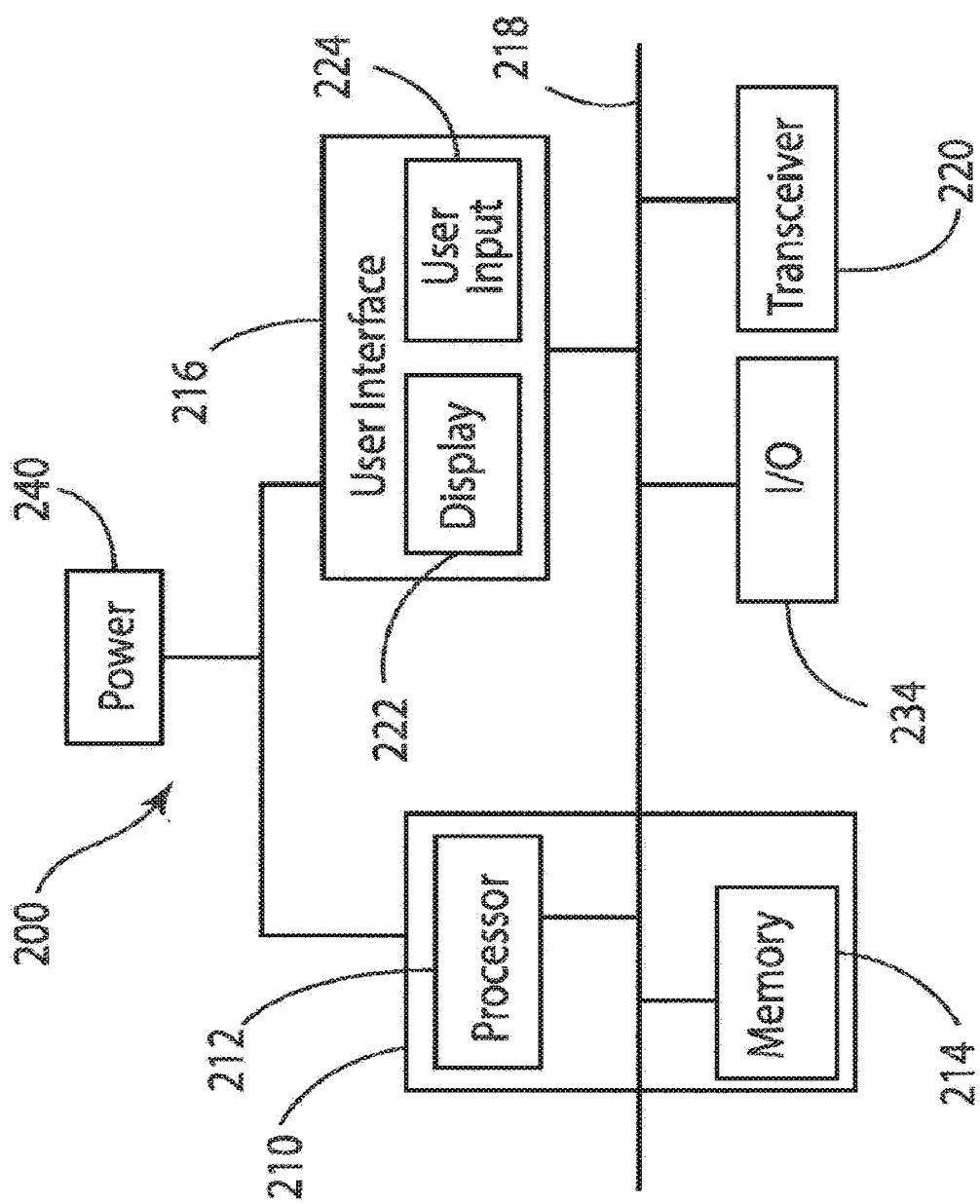
FIG. 12 illustrates an exemplary general system for use in implementing methods, techniques, devices, apparatuses, systems, servers, sources and the like, in accordance with some of the present embodiments.

Further, the processes, methods, techniques, circuitry, systems, devices, functionality, services, servers, sources and the like described herein may be utilized, implemented and/or run on many different types of devices and/or systems. Referring to FIG. 12, there is illustrated an exemplary system 200 that may be used for many such implementations, in accordance with some embodiments. One or more components of the system 200 may be used for implementing any circuitry, system, functionality, apparatus or device mentioned above or below, or parts of such circuitry, functionality, systems, apparatuses or devices, such as for example any of the above or below mentioned computing device, the systems and methods of the present invention, request processing functionality, monitoring functionality, analysis functionality, additionally evaluation functionality and/or other such circuitry, functionality and/or devices. However, the use of the system 200 or any portion thereof is certainly not required.

By way of example, the system 200 may comprise a controller or processor module, memory 214, and one or more communication links, paths, buses or the like 218. Some embodiments may include a user interface 216, and/or a power source or supply 240. The controller 212 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, programs, content, listings, services, interfaces, logging, reporting, etc. Further, in some embodiments, the controller 212 can be part of control circuitry and/or a control system 210, which may be implemented through one or more processors with access to one or more memory 214. The user interface 216 can allow a user to interact with the system 200 and receive information through the system. In some instances, the user interface 216 includes a display 222 and/or one or more user inputs 224, such as a button, touch screen, track ball, keyboard, mouse, etc., which can be part of or wired or wirelessly coupled with the system 200.

Typically, the system 200 further includes one or more communication interfaces, ports, transceivers 220 and the like allowing the system 200 to communication over a communication bus, a distributed network, a local network, the Internet, communication link 218, other networks or communication channels with other devices and/or other such communications or combinations thereof. Further the transceiver 220 can be configured for wired, wireless, optical, fiber optical cable or other such communication configurations or combinations of such communications. Some embodiments include one or more input/output (I/O) (Inport/Outport) ports 234 that allow one or more devices to couple with the system 200. The I/O (Inport/Outport) ports can be substantially any relevant port or combinations of ports, such as but not limited to USB (Universal Serial Bus), Ethernet, or other such ports.

The system 200 comprises an example of a control and/or processor-based system with the controller 212. Again, the controller 212 can be implemented through one or more processors, controllers, central processing units, logic, software and the like. Further, in some implementations the controller 212 may provide multiprocessor functionality.

The memory 214, which can be accessed by the controller 212, typically includes one or more processor readable and/or computer readable media accessed by at least the controller 212, and can include volatile and/or nonvolatile media, such as RAM (Random Access Memory), ROM (Read Only Memory), EEPROM (Electrically Erasable Programmable Read-only Memory), flash memory and/or other memory technology. Further, the memory 214 is shown as internal to the system 210; however, the memory 214 can be internal, external or a combination of internal and external memory. Similarly, some or all of the memory 214 can be internal, external or a combination of internal and external memory of the controller 212. The external memory can be substantially any relevant memory such as, but not limited to, one or more of flash memory secure digital (SD) card, universal serial bus (USB) stick or drive, other memory cards, hard drive and other such memory or combinations of such memory. The memory 214 can store code, software, executables, scripts, data, content, lists, programming, programs, log or history data, user information and the like.

Some of the present embodiments may be installed on the computing device that receives data transaction requests from the computing device from an interface. The present embodiments can be configured to process data transaction requests received through the interface. Typically, the present embodiments can be communicatively connected to a communication network (e.g., a WAN, LAN, the Internet, etc.), and has the capability of completing the data transaction requests. The present embodiments can communicationally connect with one or more remote servers that are configured to provide information useful in determining the nature of one or more data transaction requests. The present embodiments can further, in some instances, complete a data transaction request through the interface.

Further, in some applications, the remote server is implemented through and/or includes a server cluster containing multiple servers that cooperatively operate and/or communicate to provide analysis functionality. In other instances, the remote server may be implemented in part or fully on personal computer.

The present embodiments may further block access to the network access activity when the network access activity is considered an objectionable or non-compliant activity.

Third party recipients can access one or more reports in a variety of ways including, but not limited to, the report or reports being communicated by one or more of the remote servers, the third party having access to the remote server to request report, and other such methods. A request for a report can include viewing the report while the third party has access to the remote server.

In some implementations, monitoring software is installed on the computing device 1, and in some embodiments is part of the present embodiments. Additionally, or alternatively, some or all of the monitoring and/or monitoring program is implemented at a remote server. In some applications, the monitoring software can be voluntarily installed on the computing device by a user. In other instances, the monitoring software can be pre-installed on the computing device.

In some embodiments, network access activity can include, for example, access to one or more of the network activity from a group consisting of http, https, network news transfer protocols, file sharing programs, file transfer protocols, chat room access, peer to peer chats, game protocols, downloads of data, and electronic mail activity. The present embodiments can complete the data transaction request through the interface. In some implementations, the report can be made accessible by a third-party recipient (e.g., via direct access through a server, e-mail, periodic reports, text alerts, etc.).

One or more of the embodiments, methods, processes, approaches, and/or techniques described above or below may be implemented in one or more computer programs executable by a processor-based system. By way of example, such a processor-based system may comprise the processor-based system 200, a computer, a server, a smart phone, a smart watch, a tablet, a laptop, etc. Such a computer program may be used for executing various steps and/or features of the above or below described methods, processes and/or techniques. That is, the computer program may be adapted to cause or configure a processor-based system to execute and achieve the functions and/or functionality described above or below.

As an example, such computer programs may be used for implementing any type of tool or similar utility that uses any one or more of the above or below described embodiments, methods, processes, functionality, approaches, and/or techniques. In some embodiments, program code modules, loops, subroutines, etc., within the computer program may be used for executing various steps and/or features of the above or below described methods, processes and/or techniques. In some embodiments, the computer program may be stored or embodied on a computer readable storage or recording medium or media, such as any of the computer readable storage or recording medium or media described herein. Accordingly, some embodiments provide a processor or computer program product comprising a medium configured to embody a computer program for input to a processor or computer and a computer program embodied in the medium configured to cause the processor or computer to perform or execute steps comprising any one or more of the steps involved in any one or more of the embodiments, methods, processes, functionality, approaches, and/or techniques described herein. For example, some embodiments provide one or more computer-readable storage mediums storing one or more computer programs for use with a computer simulation, the one or more computer programs configured to cause a computer and/or processor based system to execute steps comprising: receiving data through the present embodiments that receives data transaction requests, from a local computing device on which the present embodiments are implemented, through an interface; and processing, through the present embodiments, data transaction requests received through said interface. Some embodiments further comprise completing said data transaction requests through the present embodiments that is communicatively connected via a wide area network (WAN) to a remote server which is communicatively connected to the present embodiments; wherein said remote server is configured to provide information useful in determining a nature of said data transaction request. Some embodiments additionally or alternatively comprise monitoring network access activity of the local computing device, including network activity of applications installed on said local computing device; recording results of monitoring said Internet access activity within said remote server. Additionally, some embodiments further comprise completing a data transaction request, by the present embodiments, through an interface. Further, in some instances, the Internet access activity can include access to at least one Internet activity from a group consisting of http, https, network news transfer protocols, file sharing programs, file transfer protocols, chat room access, peer to peer chats, game protocols, downloads of data, and electronic mail activity.

In some embodiments, systems, apparatuses and methods are provided herein useful to obtain product information through scanning. In some embodiments, a method performed by a circuit and/or one or more processors comprises receiving, through an interface, data transaction requests from a local computing device on which the present embodiments are implemented; processing, by the present embodiments, the data transaction requests received through said interface; and completing said data transaction requests through a communication connection with a wide area network (WAN).

Some embodiments further comprise providing information to a third-party recipient through processing functionality and/or programming of the present embodiments. Further, some embodiments comprise communicating, through the processing functionality, results of the processing to other portions of the present embodiments. Additionally, or alternatively, some embodiments comprise providing, through the processing functionality, information useful in determining a nature of the data transaction request.

Some embodiments further comprise monitoring network access activity of the local computing device through monitoring circuitry and/or functionality of the present embodiments. In some instances, the network access activity comprises network activity of applications installed on the local computing device. Further, some embodiments comprise recording results of monitoring the network access activity within the processing functionality. The network activity comprises, in some embodiments, network activity from one or more of and/or a group consisting of http, https, network news transfer protocols, file sharing programs, file transfer protocols, chat room access, peer to peer chats, game protocols, downloads of data, and electronic mail activity. Further, some embodiments comprise completing the data transaction, by the present embodiments, through the interface.

In some embodiments, one or more of the circuitry and/or functionality may be implemented external to the present embodiments and/or the present embodiments may be implemented through distinct circuitry, processors and/or functionality. For example, in some implementations, the monitoring functionality may reside on the local computing device independent from the present embodiments and be configured to send and receive data to the present embodiments. Accordingly, the spirit and scope of the present embodiments is not to be limited to the specific embodiments described.

Figure 15:
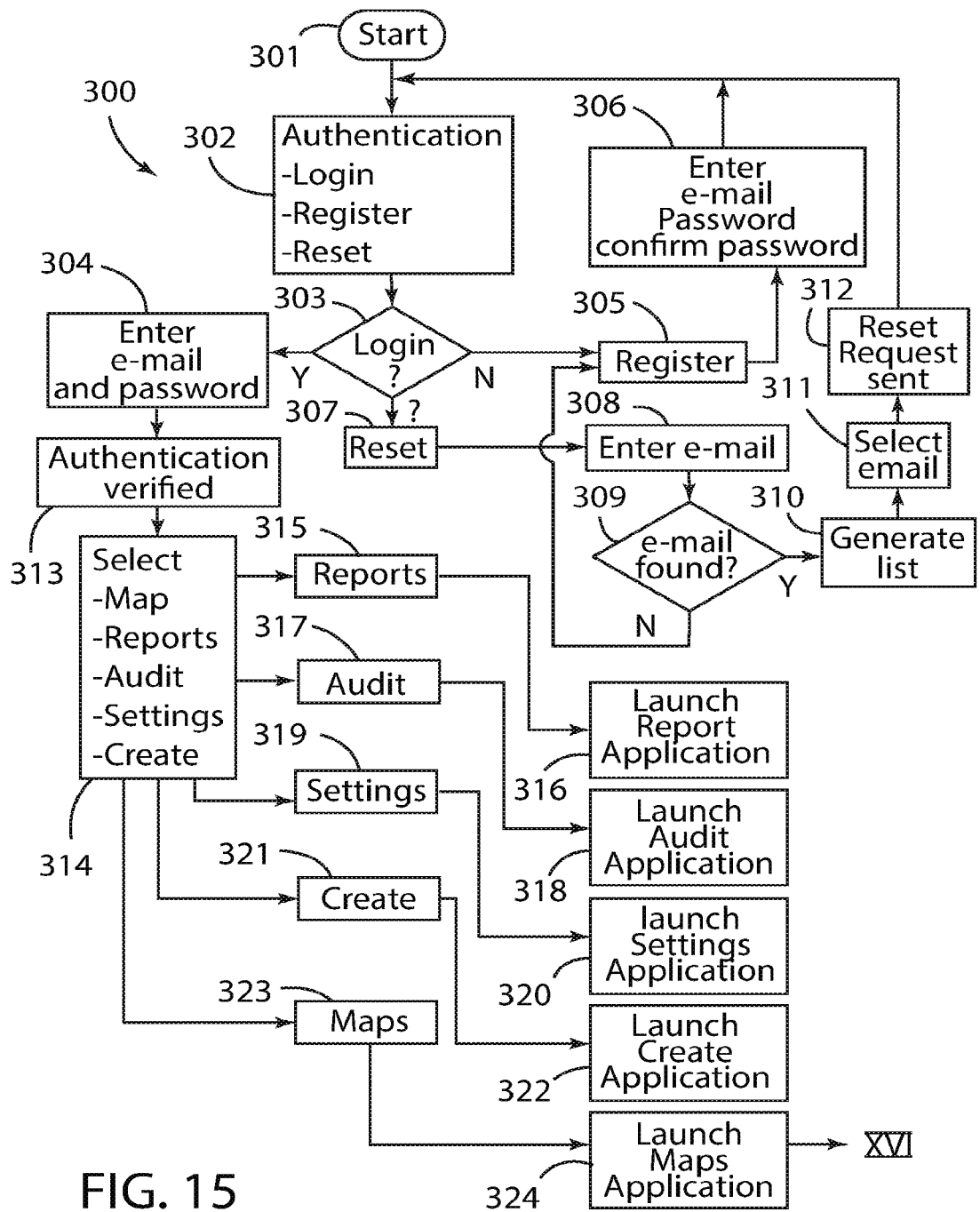
FIG. 15 presents a flowchart illustrating the high-level methods of operation of the system in accordance with some of the present embodiments.

FIG. 15 presents a flowchart illustrating the high-level methods of operation 300 of the system in accordance with some of the present embodiments. Other approaches and steps are possible within the scope of the embodiments. The system starts/initiates at step 301 by a user launching the application ("app"). The system 300 proceeds first to an authentication step 302 for a user to login to the app. Here the user can select between a login, registering for the app, or resetting their login. The system at step 303 records and acts on the selection of step 302. If the register button is selected, the system proceeds to step 305 to launch a request for an e-mail, a password and a password confirmation at step 306. The system places this in a database as a registered user, which can be previewed and approved by an administrator before allowing the user access to the system. Part of this process would be to assign rights to each user as mention above.

If reset is selected at step 302 the system proceeds via step 303 to launch the REST option at step 307, proceeding to step 308 to request entering an e-mail at step 309. If the entered e-mail is found at step 309, a list is generated at step 310, which the user can select at step 311 prompting the system to proceed to step 312 to send a reset request to the administrator. At step 312 the system can generate a notice that a reset request has been sent and loops back to login.

If the login at authentication is verified at step 313 from step 304 and system proceeds to step 314 to allow a user to select features to launch within the application. These can include selecting reports 316 which launches report application 316; selecting audit 317 which launches audit application 318; selecting settings 319 which launches settings application 320; selecting create 321 which launches create application 322; and selecting maps 323 which launches map views application 324.

Figure 16:
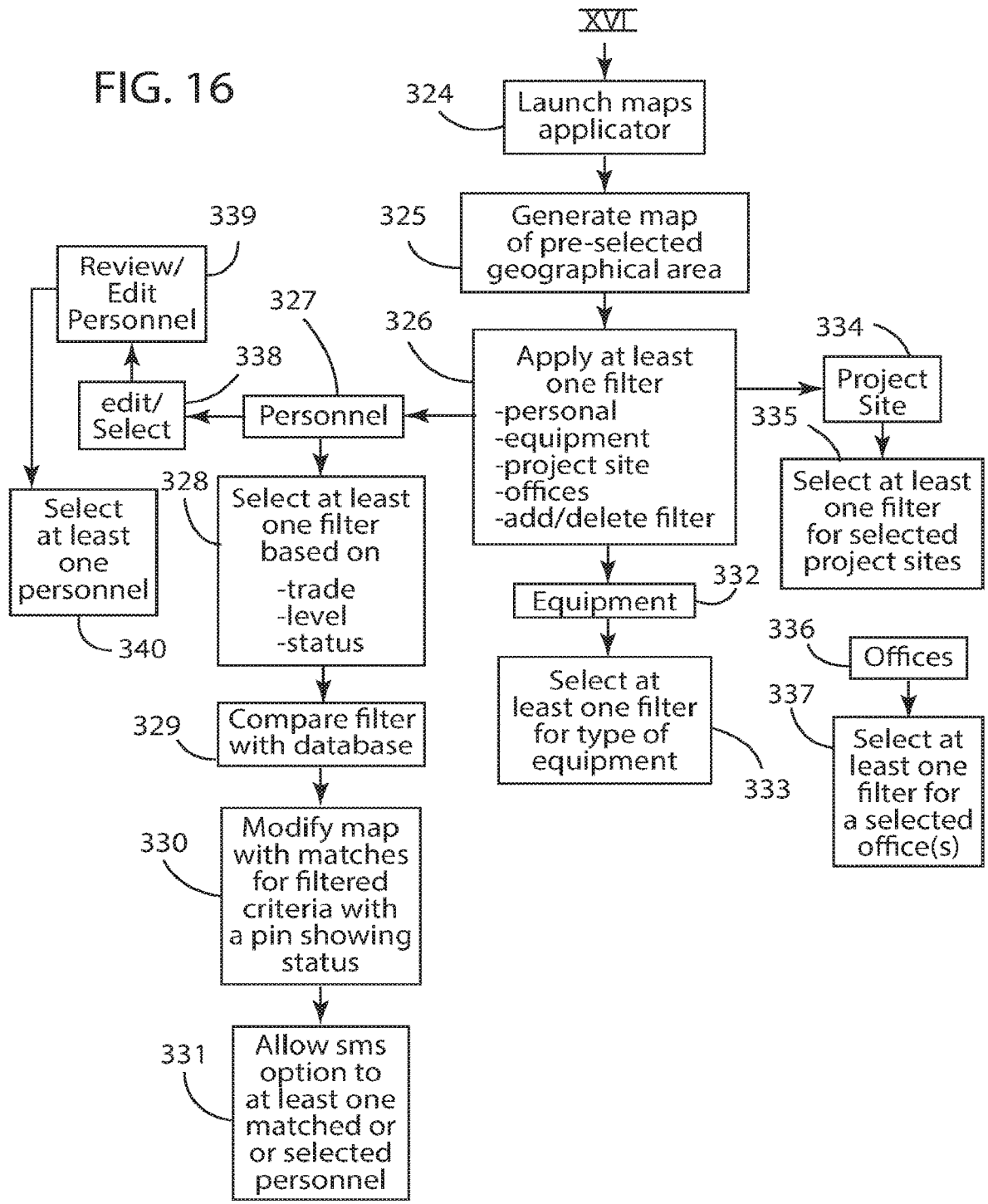
FIG. 16 presents a flowchart illustrating the high-level methods of operation of the map views of the system in accordance with some of the present embodiments.
Figure 17:
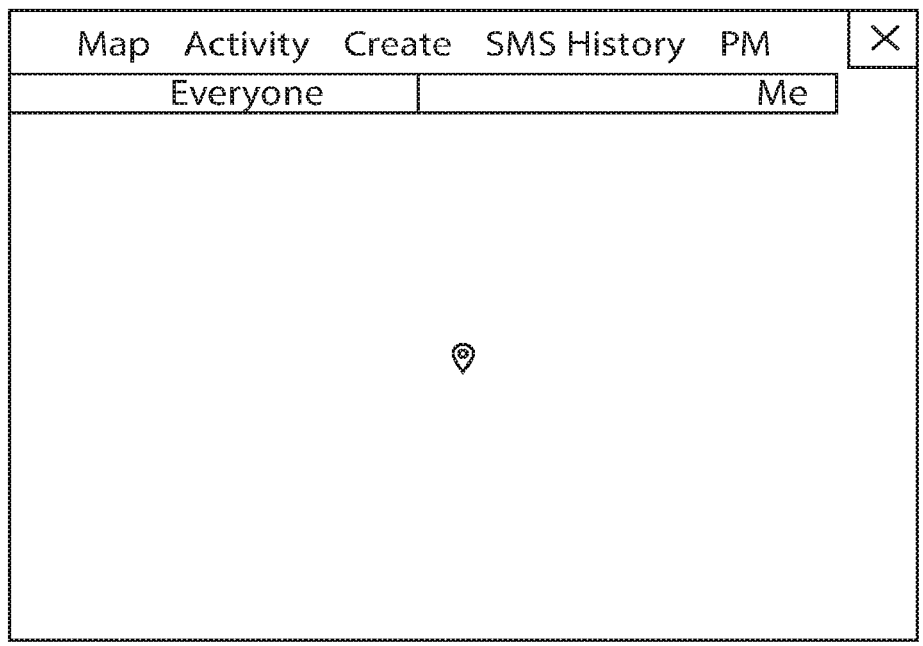
FIG. 17 presents a screenshot of an SMS Filter View in accordance with some of the present embodiments.

FIG. 16 presents a flowchart illustrating the high-level methods of operation of the map views application 324 of the system in accordance with some of the present embodiments. Once the map views application is launched, the system generates a map view at step 325 using a predetermined mapping source such as those provided under the tradenames GOOGLE MAPS and APPLE MAPS, preferably, GOOGLE MAPS. The default map view can be the current location of the user over a predetermined area, such as for example, a 100-mile radius. The user can next select at step 326 at least one of several predetermined filters linked to existing databases, such personnel, equipment, project sites, office locations, and an optional add/delete filter. If personnel is selected at step 327 the user can select to edit/select personnel at step 338, review/edit the personnel record at step 339. The user can then select a personnel record at step 340 and allow an option to send an SMS text to at least one matched or selected personal at step 331. If personnel are selected at step 327 the user can select at least one filter to apply to the personnel database at step 328. Filter options can be determined based on records collected for personnel, such as trade, skill level, status. Once the user has selected the filters to apply at step 328, the system applies the filters to the stored personnel records at step 329 and proceeds to step 330. At step 330, the system modifies the map display showing only those personnel not filtered out by the user's preselection. The personnel can be shown by a side bar list, pins on a map, or both. The pin drops are placed based on the address in the personnel record. The pins use be displayed at a predetermined size, color and/or an icon (such as shown at icon 28). Here personnel are shown, by way of example, as a blue pin with a hardhat icon. The pins can also change color based on other filtered criteria, such as skill level or status. For example, a red bubble or pin could be displayed for personnel that have been terminated; yellow for personnel that have been laid off; and green for active personnel. The map view can also proceed to step 331 to allow a user to select personnel to send and SMS text.

If at step 326, a filter is selected for equipment, the system proceeds to step 332, which allows the users to select a filter for type of equipment. This can include any type of construction equipment that may be needed to be moved to a job site or is most proximal to a job site. Once the equipment type is selected in step 333, the system proceeds to step 329 to provide a list to modify the map view at step 330. Again, for equipment a predetermined color/and or icon may be used such as the brown dump truck shown at icon 32. Again, color can be modified by status, type, etc. Also, a bubble showing the number of a filtered piece of equipment can also be displayed.

If at step 326, a filter is selected for project site, the system proceeds to step 334, which allows the users to select a filter for the project. Once the project is selected in step 335, the system proceeds to step 329 to provide a list to modify the map view at step 330. Again, for project site of a predetermined color/and or icon may be used. Again, color can be modified by status, type, etc. Also, a bubble showing the number of a filtered project site(s) can also be displayed.

If at step 326, a filter is selected for office site, the system proceeds to step 336, which allows the users to select a filter for the office. Once the office is selected in step 337, the system proceeds to step 329 to provide a list to modify the map view at step 330. Again, for office(s) a predetermined color/and or icon may be used. Again, color can be modified by status, type, etc. Also, a bubble showing the number of a filtered office project site(s) can also be displayed such as the blue home icon 34.

While the embodiments have been described in conjunction with specific embodiments, it is evident that many alternatives, modifications and variations will be apparent to those skilled in the art in light of the foregoing description. Accordingly, the present embodiments attempt to embrace all such alternatives, modifications and variations that fall within the spirit and scope of the appended claims. Throughout this specification and the drawings and figures associated with this specification, numerical labels of previously shown or discussed features may be reused in another drawing figure to indicate similar features.

LIST OF REFERENCE NUMBERS

20 Main View Map
22 pull down menu for selected side buttons (personnel)
24 Side buttons
26 'hamburger' button to show main items from the home page
28 personnel location side button filter
30 project site location button filter
32 equipment location side button filter
34 office location side button filter
36 additional location side button filter
38 filter count for personnel within map area
40 office pin.
42 personnel pin
44 equipment pin
46 project site pin
48 map
50 block for map tools
52 personnel—top pull down menu
54 filter—top pull down menu
56 trade—top pull down menu
58 status—top pull down menu
60 add filter—top pull down menu 62 top pull down menu for personnel
64 pull down menu for selected side buttons (project site)
66 filter count for project sites within map area
68 projects—top pull down menu
70 ARENA project
72 project list
74 personnel list
76 accordion collapse arrow
78 Drawer list of projects and personnel
80 personnel list individual record
82 personnel list individual record status
84 project list project
86 select button (86i, toggled on)
88 Home screen main option pull down menus
90 box/board of different entities (FIG. 13)
92 activity timeline (FIG. 14)
94 map
96 reports
98 audit
100 settings
102 CREATE
104 side menu for content types
106 Personnel
108 image
110 data points for filtering personnel
112 name
114 address
116 mobile
118 employment status
120 trade
122 skill level
124 project assignment
126 role
128 save
130 cancel
132 trade list
134 status list
136 add filter list
138 SMS history
140 check box
142 check
144 action box
146 selected personal record count
148 button to select SMS
150 button to select 'Delete personnel'
152 SMS keyboard
154 DONE button
156 SMS text preview block
158 SMS text
160 SEND button
162 CANCEL button
FIG. 11
200 processor assembly
210 exemplary system to implement some of the present embodiments
212 processor module
214 memory
216 user interface
218 communication links
220 communication interfaces, ports, transceivers
222 display
224 user inputs
234 one or more input/output (I/O) ports
240 power
FIG. 15
300 high level system
301 start
302 authentication
303 Was Login selected? At step 302
304 if yes to 303 proceed to step 304
305 if no to 303 proceed to step 305
306 register by adding e-mail and password and password confirm
307 if unknown to 303 proceed to step 307
308 enter e-mail
309 the system proceed to step 309 and determines whether the entered e-mail was found
310 if yes at 309 a list is generated
311 which the user can select
312 and the system generates a notice that a reset request has been sent and loops back to login
313 authentication verified from step 304 and proceeds to step 314
314 allows authenticated user to select action items for:
315 selecting reports
316 launches report application
317 selecting audit
318 launches audit application
319 selecting settings
320 launches settings application
321 selecting create
322 launches create application
323 selecting maps
324 launches map application
FIG. 16
325 Map generated
326 filtering option
327 personnel selected
328 select at least one personnel filter
329 compare filter with the system database
330 modify map with pins including status
331 allow SMS option to at least one of the personnel selected
332 equipment selected
333 select at least one equipment filter
334 project site
335 select at least one project site filter
336 offices selected
337 select at least one office filter
338 edit personnel selected
339 review/edit personnel to credentialed users
340 select at least one personnel

I claim:

1. A method for mapping and filtering project criteria, comprising the steps of:

receiving, by a processor in a computing device, geographic location data collected from one or more of personnel and equipment;

receiving, by the processor, project site data from a system database;

supplying a user controllable integrated interface to allow a user to interact with the system database to assist in controlling and executing the method steps and to receive information, wherein integrated interface is selected from at least one of a display, button, touch screen, track ball, keyboard, and mouse;

generating, by the processor, a map view option is user selectable from a list of application features displayed on a user electronic device;

generating, by the processor, a map view on the user electronic device in response to map view user selection, wherein the map view generating comprises interfacing with map services by third-party companies;

filtering the system database, based on user selection, from results of at least one database filter, the at least one database filter including one or more of personnel based on location, office location, and equipment based on location;

generating, by the processor, a list based on selected filtered records;

generating, by the processor, a modified map view on the user electronic device, the modified map view showing geographic locations of the list based on selected filtered records within a radius of a project site using system generated icons;

wherein the modified map view is further controllable by the system to be modified by at least one of a user system interface of zoom in/out buttons, pinch gestures of the touch screen, highlighted icons to show detail, toggle view for satellite and vector maps;

wherein the modified map view is further controllable by the system for updating the modified map view icons and filtered results based upon zoom level and radius;

generating a list view component to show the list based on selected filtered records as a list of items formatted as cards that display meta data and actions that are grouped together and scrollable, wherein the cards provide a border around different entities to facilitate sorting and identification of selected filtered records and wherein the cards comprise fly out menus with actions selected from a list of at least one SMS text message, assign to job, edit personnel, delete personnel; edit project, edit map radius, and delete project; and generating, by the processor, the at least one SMS text message on the list from the user electronic device, the at least one SMS text message on the list including a request to move the one or more of personnel and equipment corresponding to one or more of the list based on selected filtered records to the project site.

2. The method of claim 1, wherein the at least one database filter includes personnel based on location and further includes one or more of trade of personnel, skill level of personnel, and active status of personnel.

3. The method of claim 2, wherein the step of generating the modified map view showing the geographic locations of the list based on selected filtered records includes generating a display of active status.

4. The method of claim 2, wherein the step of generating the modified map view comprises generating a label showing the applied filters of the list based on selected records.

5. The method of claim 1, wherein the project includes one or more of a construction project, a utility company project, an Information Technology project, and a delivery project.

6. The method of claim 1, wherein the at least one database filter includes equipment based on location and further includes one or more of type of equipment and status of equipment.

* * * * *